United States Patent
West, III et al.

(10) Patent No.: US 10,965,672 B2
(45) Date of Patent: Mar. 30, 2021

(54) NETWORK SERVICE CONTROL FOR ACCESS TO WIRELESS RADIO NETWORKS

(71) Applicant: AT&T Intellectual Property I, L.P., Atlanta, GA (US)

(72) Inventors: Earle H. West, III, Morganville, NJ (US); Mark Fu, Irvine, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 167 days.

(21) Appl. No.: 15/952,454

(22) Filed: Apr. 13, 2018

(65) Prior Publication Data
US 2019/0319951 A1 Oct. 17, 2019

(51) Int. Cl.
*H04L 29/06* (2006.01)
*H04W 12/06* (2009.01)

(52) U.S. Cl.
CPC ...... *H04L 63/0876* (2013.01); *H04L 63/0861* (2013.01); *H04L 63/108* (2013.01); *H04L 63/126* (2013.01); *H04W 12/06* (2013.01)

(58) Field of Classification Search
CPC ............. H04L 63/0861; H04L 63/0876; H04L 63/126; H04L 63/108; H04W 12/06; H04W 12/08
See application file for complete search history.

(56) References Cited

U.S. PATENT DOCUMENTS

| | | | |
|---|---|---|---|
| 7,554,979 B2 | 6/2009 | Ikeda | |
| 7,903,646 B2 | 3/2011 | Ikeda | |
| 8,176,536 B2 | 5/2012 | Belmon | |
| 8,509,806 B2 | 8/2013 | West et al. | |
| 8,667,596 B2 | 3/2014 | Wynn et al. | |
| 8,732,801 B2 | 5/2014 | Nasir et al. | |
| 8,769,639 B2 | 7/2014 | Begorre et al. | |

(Continued)

FOREIGN PATENT DOCUMENTS

| | | |
|---|---|---|
| WO | WO 2007/128134 | 11/2007 |
| WO | WO 2014/189262 | 11/2014 |
| WO | WO 2017/005163 | 1/2017 |

OTHER PUBLICATIONS

US 9,832,608 B1, 11/2017, Thoresen et al. (withdrawn)

(Continued)

*Primary Examiner* — Mohammad A Siddiqi
(74) *Attorney, Agent, or Firm* — Hartman & Citrin LLC

(57) ABSTRACT

Concepts and technologies of network service control for remote access to wireless radio networks are provided herein. In an embodiment, a client network can be provided by a network access point that can include a processor that is configured to detect a guest user equipment and determine whether the guest user equipment is a recognized device. In response to determining that the guest user equipment is not a recognized device, the processor can create an identity verification request message that seeks approval from a host device to allow the guest user equipment to access the client network. The processor can provide the identity verification request message to the host device and receive a trigger response message. The processor can create a network access package that provides the guest user equipment with access credentials to access the client network and provide the network access package to the guest user equipment.

17 Claims, 11 Drawing Sheets

(56) References Cited

U.S. PATENT DOCUMENTS

| | | | |
|---|---|---|---|
| 8,943,554 B2* | 1/2015 | Tran | H04L 63/1416 |
| | | | 726/4 |
| 9,258,712 B2 | 2/2016 | Kiukkonen et al. | |
| 9,350,725 B2 | 5/2016 | Sposato et al. | |
| 9,369,874 B2 | 6/2016 | Otiato et al. | |
| 9,420,430 B2* | 8/2016 | Wuoti | H04W 4/023 |
| 9,491,617 B2 | 11/2016 | Chang et al. | |
| 9,497,623 B2 | 11/2016 | Reunamaki et al. | |
| 9,622,079 B2* | 4/2017 | Giordano | H04W 12/0802 |
| 9,763,094 B2 | 9/2017 | Thelen et al. | |
| 9,775,036 B2 | 9/2017 | Huber et al. | |
| 9,801,071 B2 | 10/2017 | Wynn et al. | |
| 9,843,575 B2 | 12/2017 | Liu | |
| 10,251,128 B2* | 4/2019 | Nguyen | H04W 52/0229 |
| 2009/0129338 A1* | 5/2009 | Horn | H04W 36/0007 |
| | | | 370/331 |
| 2011/0246235 A1 | 10/2011 | Powell et al. | |
| 2012/0327836 A1* | 12/2012 | Narayanasamy | H04W 76/12 |
| | | | 370/312 |
| 2013/0167196 A1* | 6/2013 | Spencer | H04L 61/6022 |
| | | | 726/3 |
| 2013/0212656 A1* | 8/2013 | Ranade | H04L 63/062 |
| | | | 726/6 |
| 2014/0355592 A1* | 12/2014 | Camps | H04W 24/08 |
| | | | 370/338 |
| 2015/0020214 A1* | 1/2015 | Copsey | G06F 21/6218 |
| | | | 726/27 |
| 2015/0317467 A1 | 11/2015 | Rattner et al. | |
| 2015/0350910 A1 | 12/2015 | Eramian | |
| 2016/0269410 A1 | 9/2016 | Liu | |
| 2016/0337239 A1* | 11/2016 | Nasielski | H04L 41/5025 |
| 2018/0007551 A1 | 1/2018 | Wang et al. | |
| 2018/0183806 A1* | 6/2018 | Nambisan | H04L 41/0893 |
| 2019/0132317 A1* | 5/2019 | Berezin | H04L 63/10 |
| 2019/0200283 A1* | 6/2019 | Graybeal | H04W 12/003 |

OTHER PUBLICATIONS

"Evolving the Mobile Employee Hotspot for IT Consumerization," IT@Intel White Paper, Intel IT, Employee Hotspot, Mar. 2014.
"AMX Operation/Reference Guide," NXA-WAPZD1000, ZoneDirector Smart WLAN Controller, Mar. 28, 2011, Ruckus Wireless.

* cited by examiner

NETWORK SERVICE CONTROL FOR ACCESS TO WIRELESS RADIO NETWORKS

BACKGROUND

Local area networks, including wireless local area networks, are becoming more prevalent both in residential and commercial environments. In a local area network, at least one router is usually employed to route messages among various devices. In some instances, a router can be communicatively coupled to a wide area network, such as the Internet and/or a provider network, and the router can route messages to and from the wide area network. Routers can provide authenticated network access to user devices based, at least in part, upon one or more conventional authentication mechanisms, such as, for example, user-provided login credentials (local or browser-based) and automated setup mechanisms (e.g., Wi-Fi Protected Setup ("WPS")), or some combination thereof. The conventional authentication mechanisms typically require efforts by both the network provider and a user intentionally making a request to access the network by initiation from the guest user device. For example, a browser-based login might require the network provider to setup and maintain a login portal so that users can sign up with the network provider, remember his or her login credential, and then sign-in using the login credentials prior to gaining access to a network.

In some situations, it may be desirable to provide a guest with temporary access to a local area network and/or a wide area network via an access point, such as a router. Conventionally, the network owner and/or provider may print or email login credentials to guest users. However, this practice can be highly insecure. In addition, the manual entry of login credentials by guest users can be prone to user error. Moreover, conventional automated setup mechanisms simply require a router be physically accessible so that the guest user can force connect their device, such as via WPS. Yet this requirement of physical access exposes a security flaw that allows anyone with physical access to the router the ability to gain access to the local area network. Further, in situations where the guest is to be granted only temporary access, the conventional mechanisms may limit the guest's capacity to control other devices that are also connected to the network for fear of malicious use by the guest. Thus, conventional authentication mechanisms can exhibit usability concerns, security flaws, and/or the denial of a guest user's request to access the network.

SUMMARY

The present disclosure is directed to network security control for access to a wireless radio network. According to one aspect of the concepts and technologies disclosed herein, a system is disclosed. In some embodiments, the system can include a network access point that has a processor and a memory. The memory can store computer-executable instructions that, when executed by the processor, cause the processor to perform operations. In some embodiments, the operations can include detecting a guest user equipment. In some embodiments, detecting the guest user equipment can include detecting a unique identifier that is being broadcast from the guest user equipment. The operations can also include determining that the guest user equipment is not a recognized device. In some embodiments, determining that the guest user equipment is not a recognized device can be based on the unique identifier of the guest user equipment. In some embodiments, when the guest user equipment is determined not to be a recognized device, the operations can include creating an identity verification request message. In some embodiments, the identity verification request message can seek approval from a host device to allow the guest user equipment access to a client network. In some embodiments, the operations can further include determining that the guest user equipment exceeds a proximity time threshold for being in range of engaging in communication with the client network. In some embodiments, the identity verification request message is created in response to determining that the guest user equipment exceeds the proximity time threshold.

The operations can further include providing the identity verification request message to the host device. The host device can respond by creating a trigger response message that can include a network access request on behalf of the guest user equipment. The operations can include receiving the trigger response message from the host device. In some embodiments, the network access point can determine whether the guest user equipment satisfies corroborating conditions. The corroborating conditions can include at least one or more of authentication of a voice signature detected by the host device, verification that the guest user equipment has visited a defined sequence of locations, verification that the guest user equipment is not on a blacklist in a remote datastore, or a combination thereof. In some embodiments, when at least one or more, or all, of the corroborating conditions are satisfied, the network access point can proceed with creating a network access package. In some embodiments, a network access package can be created prior to at least one or more, or all, of the corroborating conditions being satisfied. In some embodiments, the network access package can be created in response to receiving the trigger response message and/or the network access request from the host device. In some embodiments, the network access package can provide the guest user equipment with access credentials to access the client network.

In some embodiments, creating the network access package can include creating a service set identifier. In some embodiments, the service set identifier can be for the client network and can be created based on the unique identifier of the guest user equipment. In some embodiments, creating the network access package also can include creating a whitelist corresponding to the service set identifier that can, in some embodiments, be for the client network; instantiating the unique identifier within the whitelist; generating access credentials for the guest user equipment; and creating the network access package that can include the access credentials, a notification that the guest user equipment is authorized to use the client network, and a connection acceptance trigger that instructs the guest user equipment to send a reply message using the access credentials. The operations can further include providing the network access package to the guest user equipment. In some embodiments, the network access point can receive a reply message from the guest user equipment. The operations can continue with the network access point providing the guest user equipment access to the client network.

According to another aspect of the concepts and technologies disclosed herein, a method is disclosed. The method can include detecting, by a network access point that is communicatively coupled to a host device, a guest user equipment. In some embodiments, detecting the guest user equipment can include detecting a unique identifier that is being broadcast from the guest user equipment. The method can include determining, by the network access point, that the guest user equipment is not a recognized device. In some embodiments, determining that the guest user equipment is not a recognized device can be based on the unique identifier. In response to determining that the guest user equipment is not a recognized device, the method can also include creating, by the network access point, an identity verification request message that seeks approval from the host device to allow the guest user equipment access to a client network.

In some embodiments, the method can also include determining that the guest user equipment exceeds a proximity time threshold for being in range of engaging in communication with the client network. In some embodiments, creating the identity verification request message can be in response to the network access point determining that the guest user equipment exceeds the proximity time threshold.

In some embodiments, the method can also include providing, by the network access point, the identity verification request message to the host device. In some embodiments, the method can include receiving, by the network access point, a trigger response message from the host device, where the trigger response message can include a network access request on behalf of the guest user equipment. In some embodiments, the method can include creating, by the network access point, a network access package. In some embodiments, the network access package can be created in response to receiving the trigger response message and/or the network access request from the host device. In some embodiments, the network access package can provide the guest user equipment with access credentials to access the client network. In some embodiments, creating the network access package can include creating a service set identifier for the client network based on the unique identifier of the guest user equipment; creating a whitelist corresponding to the service set identifier for the client network, instantiating the unique identifier within the whitelist; generating access credentials for the guest user equipment; and creating the network access package that includes the access credentials, a notification that the guest user equipment is authorized to use the client network, and a connection acceptance trigger that instructs the guest user equipment to send a reply message to the network access point using the access credentials.

In some embodiments, creating the network access package can occur in response to determining, by the network access point, that the guest user equipment satisfies corroborating conditions. In some embodiments, the corroborating conditions can include at least one or more, or all, of authentication of a voice signature detected by the host device, verification that the guest user equipment has visited a defined sequence of locations, and verification that the guest user equipment is not on a blacklist in a remote datastore. The method can also include providing the network access package to the guest user equipment. In some embodiments, the method can include receiving the reply message from the guest user equipment that was sent based on the network access package. In some embodiments, the method can also include providing, by the network access point, the guest user equipment access to the client network.

According to yet another aspect, a computer storage medium is disclosed. The computer storage medium can have computer-executable instructions stored thereon. When the computer-executable instructions are executed by a processor, the processor can perform operations. In some embodiments, the processor can be included in a network access point. In some embodiments, the operations can include detecting a guest user equipment. In some embodiments, detecting the guest user equipment can include detecting a unique identifier that is being broadcast from the guest user equipment. The operations also can include determining that the guest user equipment is not a recognized device. In some embodiments, determining that the guest user equipment is not a recognized device can be based on the unique identifier. In response to determining that the guest user equipment is not a recognized device, the operations can include creating an identity verification request message that seeks approval from a host device to allow the guest user equipment access to a client network. In some embodiments, the operations can further include determining that the guest user equipment exceeds a proximity time threshold for being in range of engaging in communication with the client network. In some embodiments, creating the identity verification request can occur in response to determining that the guest user equipment exceeds the proximity time threshold. The operations can further include providing the identity verification request message to the host device.

In some embodiments, the operations can include receiving a trigger response message from the host device, where the trigger response message can include a network access request on behalf of the guest user equipment. The operations also can include creating a network access package that provides the guest user equipment with access credentials to access the client network. In some embodiments, creating the network access package can occur in response to determining that the guest user equipment satisfies corroborating conditions. In some embodiments, the corroborating conditions can include at least one or more, or all of, authentication of a voice signature detected by the host device, verification that the guest user equipment has visited a defined sequence of locations, and verification that the guest user equipment is not on a blacklist in a remote datastore. In some embodiments, creating the network access package can include the operations of creating a service set identifier for the client network based on the unique identifier of the guest user equipment; creating a whitelist corresponding to the service set identifier for the client network; instantiating the unique identifier within the whitelist; generating access credentials for the guest user equipment; and creating the network access package that includes the access credentials, a notification that the guest user equipment is authorized to use the client network, and a connection acceptance message that instructs the guest user equipment to send a reply message using the access credentials. In some embodiments, the operations can include receiving the reply message from the guest user equipment. The operations also can include providing the network access package to the guest user equipment.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
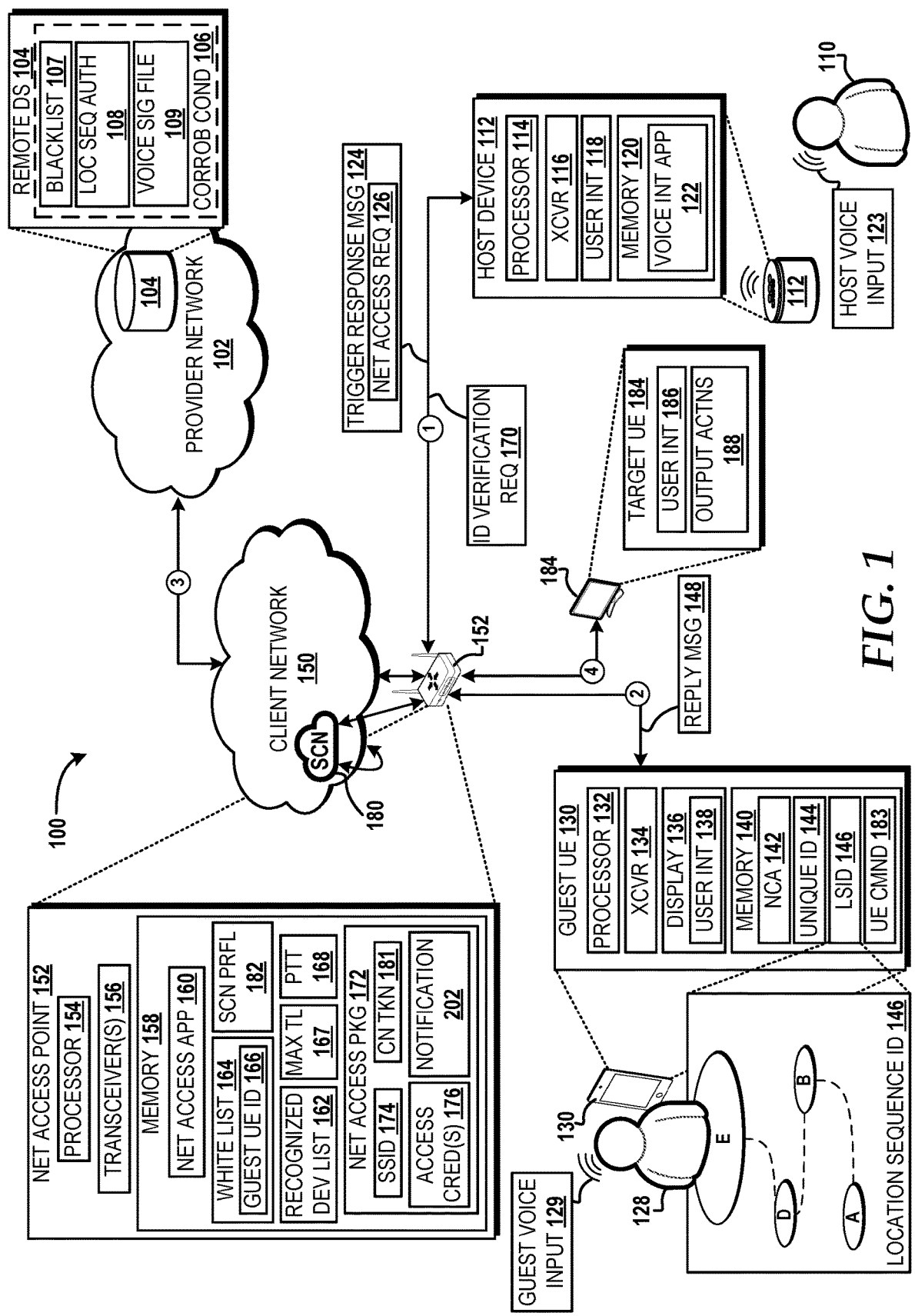
FIG. 1 is a block diagram illustrating aspects of an example operating environment for providing network security control for various embodiments of the concepts and technologies described herein.

The following detailed description is directed to network service control for access to wireless radio networks. As the use of user equipment ("UE"), such as mobile communications devices, becomes more prevalent, users may carry their UEs with them as they travel to work and social events. When a user is a guest at a new location, such as a retail establishment and/or to the house of a friend, the guest user may wish to access a network at the new location. The network at the new location can be referred to as a client network, such as a wireless radio network, that is provided by a network access point. The network access point can be configured and/or controlled by a host device that belongs, or is otherwise under the control of, a host user. Examples of the host device can include, but should not be limited to, a voice communication assistance device that is configured to listen for audible commands from a host user, and in response to the audible commands, perform actions. For example, when the host user says "voice assistant, play a song", the host device will be triggered by this audible command, and in response, execute a program that plays the song requested by the host user. However, in some embodiments, conventional systems that incorporate host devices may be unaware that the guest user has brought along their UE, also referred to as a guest UE. Conventional mechanisms for allowing the guest UE access to the client network may require the host user to physically provide the guest user with login credentials that must be manually entered in a web portal. This can be cumbersome and cause unnecessary stress to the guest user. Although the host user may not object to physically providing the login credentials to one guest user, in some environments (e.g., a sports stadium, a shopping mall, or other retail establishment), it may not be feasible to manually program the guest UEs of every customer that is at the location where the client network is provided. Moreover, uncontrolled distribution of sensitive login credentials can pose a network security risk that may expose the client network to potentially malicious activity of nefarious guest UEs.

As such, embodiments of the present disclosure can enable guest UEs to connect and access the client network while maintaining network security control for the client network. For example, the host device can communicatively couple with a network access point that is configured to provide, at least in part, the client network. The network access point can detect when a guest UE is within physical proximity to the network access point such that connection to the client network is possible. The network access point can determine whether the guest UE is recognized so as to distinguish between devices that are known to the network access point. If the network access point does not recognize the guest UE, then the network access point can perform operations to determine whether to allow the guest UE to access the client network. For example, in some embodiments, the network access point can determine whether the guest UE is simply passing by the location where the client network is provided (e.g., a guest UE in a moving car passing outside of a building where the network access point is located or a shopper with a guest UE that is walking past a retail store in a shopping center) or intending to stay within proximity of the client network for at least a designated amount of time (e.g., a shopper entering a retail store where the client network is provided or a party guest desiring to use a guest UE while attending a viewing party that shows a sporting event on a smart television connected to the client network).

In some embodiments, when the network access point determines that the guest UE is staying within an area of the client network, the network access point can create an identity verification request message that instructs a host device to ask a host user for permission to grant the guest UE access to the client network and/or other networks and devices accessible via the client network. If the host user grants access, such as via a voice command and/or input via a user interface of the host device, then the network access point can receive a trigger response message from the host device. In some embodiments, the network access point can determine whether any corroborating conditions should be satisfied by the guest UE prior to allowing the guest UE access to the client network. For example, the corroborating conditions can include, but should not be limited to, determining that the guest UE is not deemed to be nefarious, determining that the guest user is in control of the guest UE by authenticating a voice signature of the guest user, and/or determining whether a certain sequence of actions has been performed, such as ensuring that the guest user has visited certain locations, possibly in a particular sequence, prior to arriving at the current location so as to authenticate certain guest UEs. The network access point can prepare a network access package for the guest UE that enables the guest UE to access the client network. The network access point can provide the network access package to the guest UE, thereby providing network access to the guest UE while maintaining network security control of the client network. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for network security control will be described, according to an illustrative embodiment. The operating environment 100 shown in FIG. 1 includes a communications service provider network ("provider network") 102 that is communicatively coupled with a client network 150 provided, at least in part, by a network access point 152. In some embodiments, the client network 150 can be configured as a wireless radio access network. For example, the network access point 152 can operate in accordance with any IEEE 802.11 ("Wi-Fi") standard(s) to provide the client network 150. In other embodiments, the network access point 152 can be a network edge router that includes a Wi-Fi access point. In some embodiments, the network access point 152 can provide the client network 150 at a generally fixed location (e.g., by the network access point 152 being located in a house, workplace, retail establishment, etc.) and/or at a variable/mobile location (e.g., the network access point 152 being located in a motor vehicle that is capable of having dynamic geolocations). It is understood that the examples provided are for illustration purposes only, and therefore should not be construed as limiting in any way.

In some embodiments, the network access point 152 can include one or more internal transceivers, antennas, modems, or the like, each of which can facilitate and/or otherwise provide connectivity to one or more wide area networks ("WANs"), such as the provider network 102, that facilitate communications with one or more other networks including the Internet (not shown), for example. In some embodiments, the network access point 152 can be connected to one or more external modems of the provider network 102, thereby allowing for implementation of connectivity to the provider network 102 via one or more wireline (e.g., fiber optic, coaxial, and the like) and/or wireless communication paths, which are embodied as communication path 3. Those skilled in the art will appreciate the numerous configurations of network connectivity among the client network 150, the network access point 152, and the provider network 102, and as such, the examples disclosed herein are merely intended to describe common configurations and do not limit the scope of the concepts and technologies disclosed herein.

The provider network 102 can be associated with an Internet Service Provider ("ISP") and/or other communications service provider, which might be an individual, a business, or other entity, associated with providing a network service of which a home owner, other individual, or entity can subscribe to access the provider network 102. The provider network 102 can be supported by one or more compute resources, memory resources, and/or other resources. For example, the compute resource(s) can include one or more particular hardware devices that perform computations to process data, and/or to execute computer-executable instructions of one or more application programs, operating systems, and/or other software, including applications that provide access to a remote data store 104. The compute resources can include one or more central processing units ("CPUs") configured with one or more processing cores, and/or one or more graphics processing unit ("GPU") configured to accelerate operations performed by one or more CPUs. The compute resources can include one or more system-on-chip ("SoC") components along with one or more other components, including, for example, one or more of the memory resources, and/or one or more of the other resources. The memory resource(s), such as the remote data store 104, can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources. The other resource(s) can include one or more hardware and/or virtual resources, one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like. In some embodiments, the compute resources, the memory resources, and/or the other resources can collectively function to enable network traffic across the provider network 102 so as to support communication services for user equipment. Additional details of aspects of the provider network 102 are illustrated and described below with reference to FIG. 7.

In some embodiments, the network access point 152 can be owned and/or operated by the communication service provider associated with the provider network 102. In some embodiments, the network access point 152 may be rented and/or provided to a user as part of a subscription for access to the provider network 102. For example, a host user 110 might be a home owner or other individual who subscribes to a communication service associated with the provider network 102, and rents, purchases, or is otherwise provided the network access point 152. In other embodiments, the network access point 152 may be controlled by the communication service provider of the provider network 102. In some embodiments, the host user 110 uses a host device 112 to control, at least in part, operation of the network access point 152 in order to provide the client network 150 and control of access to the client network 150, the provider network 102, and/or devices connected thereto, such as a target UE 184.

In some embodiments, the host device 112 can include a processor 114, a transceiver 116, a user interface 118, and a memory 120. The transceiver 116 can support wireless communicative coupling with the network access point 152 via communication path 1. The user interface 118 can include audio input and output so as to receive audible commands from the host user 110, such as one or more host voice input 123. The memory 120 stores a voice interface application 122 that can be configured to listen for the host voice input 123 from the host user 110. The voice interface application 122 can interpret the host voice input 123 as an audible command that triggers the host device 112 to provide functionality, such as to control accessibility to the client network 150 via the network access point 152.

In some embodiments, the host device 112 can be configured as a voice communication assistant device. Examples of a voice communication assistant device can include, but should not be limited to, the "ECHO" and/or "DOT" by AMAZON DOT COM LLC, the "HOME" and/or "HOME MINI" by ALPHABET INC, or other user equipment that can be configured with voice assistant application(s). In some embodiments, the host device 112 can be provided by smartphones, tablets, computers, Internet of Things ("IoT") devices, vehicle computing systems, global positioning system ("GPS") receivers, GPS navigation devices, wearable computing systems, embedded computing devices for appliances or other systems or structures, smart watches and other "smart" devices, point-of-sale devices, headwear and/or eyewear, augmented reality ("AR") devices, virtual reality ("VR") devices, audio systems, video systems, video game systems, combinations thereof, and/or the like. For ease of description, and not limitation, the host device 112 will be described according to an embodiment as a voice communication assistant device that can communicatively couple to the network access point 152. It should be understood that the examples discussed are for illustration purposes only, and therefore should not be construed as limiting, in any way, the scope or manner of implementations.

The network access point 152 can include a processor 154 and one or more transceiver 156 that can provide the client network 150. The transceiver 156 can provide the client network 150 such that the client network is configured as a wireless radio access network. The network access point 152 can include at least one antenna and modem that allows for communicative coupling via one or more wired and/or wireless communication paths, such as but not limited to, communication path 1, communication path 2, communication path 3, and communication path 4. The network access point 152 also can include a memory 158 that stores a network access application 160. In some embodiments, the network access application 160 can be configured as firmware that resides on hardware components of the network access point 152 and is executable by at least the processor 154. The network access application 160 can be configured to provide, at least in part, a wireless radio network, such as the client network 150, so as to allow communicatively coupled devices (e.g., the host device 112) to communicate with other devices and the provider network 102. Although one instance of the network access point 152 is illustrated in FIG. 1, it is understood that multiple instances of the network access point 152 can be included in various embodiments. The network access point 152 can provide wired and/or wireless communicative coupling and can include one or more of a base station, a wireless router, a femtocell, an eNode B, a NodeB, a gNode B (i.e., an access point that incorporates new radio access technology, such as LTE-Advanced and other 5G technology) and/or other network nodes that can facilitate communication to and/or from the client network 150.

In some embodiments, the network access application 160 can be configured to detect when a guest UE, such as the guest UE 130, is within proximity of the network access point 152 so as to be capable of engaging in communication with the client network 150. The operating environment 100 can include one or more instances of a guest UE, such as the guest UE 130. The guest UE 130 can be configured as one or more of smartphones, tablets, computers, Internet of Things ("IoT") devices, vehicle computing systems, global positioning system ("GPS") receivers, GPS navigation devices, wearable computing systems, embedded computing devices for appliances or other systems or structures, smart watches and other "smart" devices, point-of-sale devices, headwear and/or eyewear, augmented reality ("AR") devices, virtual reality ("VR") devices, audio systems, video systems, video game systems, combinations thereof, and/or the like. For clarity, the guest UE 130 is configured as a mobile communication device in the embodiment illustrated in FIG. 1, however it is understood that the embodiment is illustrative and should not be construed as limiting the scope of embodiments in any way. In general, the guest UE 130 is capable of wireless radio communication (e.g., Wi-Fi, LTE, 5G, etc.), and thus is capable of communicating with the network access point 152 to access a network (e.g., any of the client network 150 and/or the provider network 102), and/or one or more devices connected to a network (e.g., the host device 112 and/or the target UE 184 discussed in further detail below).

The guest UE 130 can include a processor 132 and a transceiver 134 that provides communicative coupling with the network access point 152, such as via communication path 2. The guest UE 130 can include a display 136 that can be configured to present a user interface 138 by which a guest user 128 can provide inputs and receive outputs. Examples of embodiments of the user interface 138 will be discussed below with respect to FIGS. 2A-2C. In some embodiments, the guest UE 130 can also include audio input and output hardware by which to receive audible commands and communications from the guest user 128 (e.g., a guest voice input 129). Examples of the guest voice input 129 can include, but should not be limited to, audible communications produced by the guest user 128 that can be used for analysis and execution, such as by the guest UE 130, the host device 112, or another particular communications device. The guest UE 130 also can include a memory 140 that stores a network connection application 142.

The memory 140 also can include a unique identifier 144 that is associated with the guest UE 130. Examples of the unique identifier 144 can include, but should not be limited to, a media access control ("MAC") address, a mobile equipment identifier ("MEI"), an international mobile equipment identity ("IMEI"), a Type Allocation Code ("TAC"), an electronic serial number, original equipment manufacturer identity, a telephone number, an email address, a user name, a user identifier, a persona, a combination thereof, or the like. In some embodiments, the network connection application 142 can broadcast, via the transceiver 134, the unique identifier 144 that is associated with the guest UE 130. For example, when the guest user 128 carries the guest UE 130 into the home of the host user 110, the guest UE 130 may be in proximity (i.e., within communicative coupling range of the network access point 152) of the client network 150 provided by the network access point 152. The unique identifier 144 can be detected by the network access application 160 of the network access point 152.

The memory 140 also can include a location sequence identification ("LSID") 146. In some embodiments, the LSID 146 can include a string of one or more location indicators (e.g., geocoordinates, geo tags, location names, addresses, or the like) from which the guest UE 130 has visited within a defined period of time (e.g., within the past twenty-four hours). For example, as illustrated in FIG. 1, the guest UE 130 may have visited locations A, B, D, and E that are indicated within the LSID 146. The locations identified within the LSID 146 can correspond with physical locations. In some embodiments, one or more locations stored within the LSID 146 can correspond with a virtual location, such as visitation of a website, media content, or the like, which is stored as a web address and/or virtual marker so as to indicate that the guest UE 130 has performed a task at the virtual location. In some embodiments, the LSID 146 can be generated by the network connection application 142 when the guest UE 130 arrives at a particular location, such as by using a location component hardware and/or software, which is discussed in further detail with respect to FIG. 5. In some embodiments, the locations indicated in the LSID 146 can be generated by the network connection application 142 based on input from the guest user 128 associated with the guest UE 130. For example, input of location information for the LSID 146 can be provided to the user interface 138, such as shown in FIGS. 2B and 2C which will be discussed in further detail below.

In some embodiments, the network access point 152 can initiate a process by which the guest UE 130 is granted access to the client network 150 and/or provider network 102. For example, the network access application 160 of the network access point 152 can use the unique identifier 144 of the guest UE 130 to determine, via a recognized device list 162, whether the guest UE 130 is a recognized device. The recognized device list 162 can include a data structure stored in the memory 158 of the network access point 152 and/or in the memory of the remote data store 104 of the provider network 102. The recognized device list 162 can include a list of identifiers associated with devices that are connected, and/or have been connected at one time, to the client network 150 via the network access point 152. For example, when the network access application 160 detects the unique identifier 144 of the guest UE 130, the network access application 160 can check whether the unique identifier 144 is already stored in the recognized device list 162. If the unique identifier 144 is already stored in the recognized device list 162, then the network access application 160 determines that the guest UE 130 is a recognized device. In some embodiments, if the guest UE 130 is considered to be recognized device, then the network access application 160 may, in some embodiments, wait for the network connection application 142 of the guest UE 130 to initiate contact. Put differently, the network access application 160 of the network access point 152 may not attempt to grant the guest UE 130 access to the client network 150 until the guest UE 130 makes a network access request via the network connection application 142. However, if the network access application 160 of the network access point 152 determines that the unique identifier 144 is not stored in the recognized device list 162, then the network access application 160 can take further action to act on behalf of the guest UE 130 (i.e., without initiation from the guest UE 130 to begin approval to access the client network 150).

In some embodiments, the network access application 160 can identify between devices that are simply passing through the location where the client network 150 is provided and devices that are staying within proximity of the client network 150. For example, the memory 158 of the network access point 152 can store a proximity time threshold 168 that is represented as a time value (e.g., measured in seconds, minutes, etc.). For example, in some embodiments, the proximity time threshold 168 may indicate a value of ninety seconds. In some embodiments, the network access application 160 can identify the current time with the time when the unique identifier 144 of the guest UE 130 was first detected by the network access point 152. If the network access point 152 detects the guest UE 130 for a greater amount of time than the proximity time threshold 168 (e.g., greater than ninety seconds in an embodiment), then the network access application 160 determines that the guest UE 130 exceeds the proximity time threshold 168 and is within range of engaging in communication to access the client network 150. In some embodiments, the memory 158 can store a maximum time limit 167 that is represented as a time value (e.g., thirty minutes, sixty minutes, etc.). The maximum time limit 167 can correspond with a maximum amount of time that the guest UE 130 is allowed to connect with the network access point 152 and/or one or more networks in one timed network session. In some embodiments, the host voice input 123 of the host user 110 can be translated by the voice interface application 122 to change one or more time value stored as the maximum time limit 167 and/or the proximity time threshold 168. As such, the examples discussed above are for illustration purposes only, and therefore should not be construed as limiting in any way.

In some embodiments, the network access application 160 can create an identity verification request message 170 that is addressed to the host device 112. The identity verification request message 170 can be delivered to the host device 112 via communication path 1, which can include wired and/or wireless transport mechanisms. In some embodiments, the identity verification request message 170 can seek approval from the host device 112 so as to allow the guest UE 130 to access to the client network 150 via the network access point 152. According to embodiments, the identity verification request message 170 can include the unique identifier 144 of the guest UE 130. The identity verification request message 170 can be configured to instruct the host device 112 to present, via the user interface 118 (e.g., via audible announcements and/or visual presentation), the host user 110 with a notification that the guest UE 130 has been detected and approval is being sought from the host user 110 as to whether access should be granted or denied for the guest UE 130. In an embodiment, the host user 110 can respond by providing input via the user interface 118 either granting or denying the guest UE 130 access to the client network 150, and/or another network provided by the network access point 152. According to embodiments, the input provided by the host user 110 can be the host voice input 123 that can be interpreted by the voice interface application 122. For example, the host voice input 123 can be received by the voice interface application 122 of the host device 112 and analyzed (e.g., through voice recognition) to determine that the host user 110 either grants and/or denies the guest UE 130 access to the client network 150 via the network access point 152. According to further embodiments, the input provided by the host user 110 can be received via a display (not shown) of the host device 112.

Based on the input received from the host user 110 (e.g., the host voice input 123), in some embodiments, the host device 112 can create a trigger response message 124. In some embodiments, the trigger response message 124 can be addressed to the network access application 160 executed by the network access point 152 and can reference the unique identifier 144 associated with the guest UE 130 so that the network access application 160 understands that the trigger response message 124 pertains to the guest UE 130. In some embodiments, the trigger response message 124 can indicate approval of the identity verification request message 170, thereby informing the network access application 160 that the guest UE 130 is allowed to gain access through the network access point 152. In some embodiments, the trigger response message 124 can include a network access request 126. Conventionally, a network access request would typically be generated only by the device that is seeking to gain access to a network. However, embodiments of the present disclosure provide that the host device 112 creates the network access request 126 on behalf of the guest UE 130 so as to reduce the operations taken by the guest UE 130 to gain access to the client network 150. Thus, the guest UE 130 does not need to independently send a network access request from the guest UE 130 to the network access point 152 because the network access request 126 was already included within the trigger response message 124 sent by the host device 112 on behalf of the guest UE 130. In some embodiments, when the network access request 126 is included in the trigger response message 124, the network access application 160 uses the inclusion of the network access request 126 within the trigger response message 124 as a trigger to generate or otherwise create a network access package 172.

In some embodiments, the network access application 160 can determine whether one or more corroborating conditions, such as corroborating conditions 106 stored on the remote data store 104, have been satisfied by the guest UE 130. This determination can be made by the network access application 160 prior to sending the identity verification request message 170 to the host device 112 or after receiving the trigger response message 124 from the host device 112. In some embodiments, the network access application 160 may require that one or more of the corroborating conditions 106 be satisfied by the guest UE 130 prior to the guest UE 130 being granted access and/or maintaining access to the client network 150. For example, the remote data store 104 can store the corroborating conditions 106 using one or more memory resources. For example, in some embodiments, the remote data store 104 can store a blacklist 107 that is provided as a data structure within the remote data store 104. In some embodiments, the provider network 102 can be communicatively coupled to a plurality of network access points corresponding to individual subscribers to a communication service of a communication service provider. In some embodiments, one or more network access points may determine that a particular device should not be permitted to access the provider network 102 and/or a network access point associated with the provider network 102, such as the network access point 152. As such, if a device has been banned from use of the provider network 102, an identifier corresponding to the banned device may be added to the blacklist 107. Thus, in an embodiment where the guest UE 130 has been banned from using the provider network 102, the unique identifier 144 associated with the guest UE 130 would be stored in the blacklist 107. It is understood that the example provided is for illustration purposes only. In some embodiments, the network access application 160 can access the blacklist 107 on the remote data store 104 and determine that the blacklist 107 does not include the unique identifier 144 corresponding to the guest UE 130. Thus, the network access application 160 can verify that the guest UE 130 is not on the blacklist 107 of the remote data store 104 by determining that the unique identifier 144 of the guest UE 130 is not found within the blacklist 107 at the time that the guest UE 130 is detected by the network access point 152. Thus, an example of satisfying a corroborating condition, such as one or more of the corroborating conditions 106, can include verifying that the guest UE 130 is not on the blacklist 107 of the remote data store 104.

In some embodiments, satisfying one of the corroborating conditions 106 can include verification that the guest UE 130 has visited a defined sequence of locations. For example, the memory of the remote data store 104 can include a location sequence authentication string ("LSAS") 108. In some embodiments, the LSAS 108 can be configured to take the same format as the LSID 146 of the guest UE 130. The LSAS 108 can include a string of one or more location indicators (e.g., geocoordinates, geo tags, location names, addresses, or the like) that define a sequence of locations and, in some embodiments, a defined period of time (e.g., twenty-four hours) that set forth the sequence of locations that should be visited. In some embodiments, the LSAS 108 can be defined, modified, and/or controlled by the host device 112 via the network access point 152. The LSAS 108 can be used to verify whether the guest UE 130 has visited one or more locations in a defined period of time. In some embodiments, the LSAS 108 may indicate that the sequence of locations needs to be visited in a particular order. For example, in an embodiment, the client network 150 may be provided in a retail shopping mall, and in order for shoppers to use their device on the client network 150, the shoppers must visit one or more retail stores within the mall, the location of which is tracked by the shopper's device (e.g., the guest UE 130) and indicated by the LSID 146. Thus, in some embodiments, the guest UE 130 can provide the LSID 146 to the network access point 152, and the network access application 160 can compare the LSID 146 to the LSAS 108. In an embodiment, if one or more, or all, of the location indicators of the LSID 146 matches the location indicators of the LSAS 108, then the network access application 160 verifies that the guest UE 130 has visited the defined sequence of locations as indicated by the LSAS 108, thereby satisfying one of the corroborating conditions 106.

In some embodiments, satisfying one of the corroborating conditions 106 can include authentication of a voice signature, where the voice signature can be detected by a device connected to the client network 150, such as the host device 112. For example, the remote data store 104 can include a voice signature file 109 that provides a digital file representing the unique voice signature for a user. For example, in an embodiment, the voice signature file 109 is associated with a voice signature of the guest user 128 that corresponds with the guest UE 130. In some embodiments, the voice signature file 109 can include sound data corresponding to audible sound frequencies produced by the guest user 128, such as when the guest user 128 provides the guest voice input 129. In some embodiments, the voice signature file 109 can be provided based on a voicemail greeting and/or another voice communication that can be used for comparison with the guest voice input 129 provided by the guest user 128. In some embodiments, the guest voice input 129 spoken by the guest user 128 can be received by the voice interface application 122 of the host device 112 via an input, such as a microphone of the host device 112. In some embodiments, the guest voice input 129 can be translated into a guest voice message (not shown) and sent to the network access application 160 of the network access point 152. The network access application 160 can compare the guest voice message to the voice signature file 109, and if at least a defined portion of the audible sound frequencies indicated by each of the guest voice message and the voice signature file 109 match (e.g., greater than ninety five percent), then the voice signature of the guest user 128 is deemed by the network access application 160 to be authentic, thereby satisfying a corroborating condition. In an embodiment, when at least one or more, or all, of the corroborating conditions 106 are satisfied, the network access point 152 can proceed with creating a network access package, such as the network access package 172. It is understood that zero, one, or more than one of the corroborating conditions 106 may be satisfied prior to and/or after the guest UE 130 is allowed to communicate via the network access point 152. It is understood that the examples provided are for illustration purposes only, and therefore should not be construed as limiting in any way.

In some embodiments, the network access point 152 can allow the guest UE 130 to connect and/or reconnect to the client network 150 by creating the network access package 172 for the guest UE 130. The network access package 172 can take the form of a digital executable package that can be created and/or managed via the network access application 160 of the network access point 152. The network access package 172 can include a service set identifier 174 that informs the guest UE 130 of which network the guest UE 130 is allowed to connect. For example, in some embodiments, the service set identifier 174 can correspond with the client network 150 and/or a sub-client network 180, which will be discussed in further detail below. The network access package 172 also can include a set of access credentials 176. The access credentials 176 can include one or more of a key, a passcode, and/or other credentials that can be used to ensure a secure connection with the network access point 152. The access credentials 176 can be used by the guest UE 130 to establish and/or maintain a connection with the network access point 152. In some embodiments, the network access package 172 also can include a notification 202, which is illustrated according to various embodiments in FIGS. 2A-2C. The notification 202 can be presented to the guest UE 130 so as to notify the guest user 128 that the guest UE 130 is authorized and/or pre-approved to communicate via the network access point 152, such as through use of the client network 150. In some embodiments, the notification 202 can include a connection acceptance trigger, which will be discussed in further detail with respect to FIGS. 2A-2C. In some embodiments, the network access package 172 can be configured to instruct the guest UE 130 to send a reply message 148 to the network access point 152. In some embodiments, the reply message 148 can include the access credentials 176, the service set identifier 174, the LSID 146, a client network token 181 (discussed below), and/or the unique identifier 144. In some embodiments, the network access application 160 can receive the reply message 148, and determine whether the access credentials 176 included therein match the access credentials sent to the guest UE 130. In some embodiments, the network access application 160 of the network access point 152 can provide the guest UE 130 access to the client network 150 based on, at least in part, the access credentials 176 within the reply message 148.

In some embodiments, the network access application 160 can create a whitelist 164 that is stored in the memory 158. In some embodiments, the whitelist 164 can be stored in the remote data store 104. The whitelist 164 can correspond to one or more networks that is provided by the network access point 152, such as the client network 150. Therefore, in some embodiments, the whitelist 164 can identify and correspond with the service set identifier 174 that is provided in the network access package 172. By this, when the network access application 160 receives a message from the guest UE 130, such as the reply message 148, the network access application 160 can extract the service set identifier 174 included in the message to identify the whitelist 164. In some embodiments, the network access application 160 can instantiate the unique identifier 144 within the whitelist 164, which is represented as a guest UE identifier 166. The guest UE identifier 166 can be a copy of, and/or based on, the unique identifier 144 of the guest UE 130. In some embodiments, the unique identifier 144 is instantiated within the whitelist 164 by storing the guest UE identifier 166 within the whitelist 164. The unique identifier 144 can be instantiated within the whitelist 164 when one or more of the corroborating conditions 106 is satisfied by the guest UE 130. In some embodiments, a network provided by the network access point 152, such as the client network 150, can be used only by devices that are identified on a whitelist, such as the whitelist 164. For example, in an embodiment, the whitelist 164 includes identifications of all devices connected to, and/or authorized to connect to, the client network 150, such as, for example, the host device 112, the target UE 184, and/or the guest UE 130. In some embodiments, the whitelist 164 can correspond to a sub-client network that is provided by the network access point 152 and is associated with, but distinct from, the client network 150, such as the sub-client network 180.

In some embodiments, the sub-client network 180 can be provided by the network access point 152 and/or another access point that is controlled by the network access application 160 of the network access point 152. The sub-client network 180 can include a wireless radio network that operates a unique radio frequency that is different and/or the same as the client network 150. In some embodiments, the sub-client network 180 can operate on a radio channel so as not to interfere with communications on the client network 150. In some embodiments, the sub-client network 180 can be a virtual network that operates via a hypervisor (not shown) of the network access point 152. In some embodiments, the service set identifier 174 can correspond with the sub-client network 180. In some embodiments, the service set identifier 174 can be created based on the unique identifier 144. In some embodiments, the network access application 160 can create a sub-client network profile 182 corresponding to the sub-client network 180. In some embodiments, the sub-client network profile 182 can include network configuration parameters such as, for example, time limits, network proximity and re-entry, port access, IP address range, throttling, download/upload data limit, download/upload time, misbehavior tolerance, combinations thereof, and the like. In some embodiments, the sub-client network 180 can be designated for use exclusively by the guest UE 130. For example, the sub-client network profile 182 can be bound to the whitelist 164 such that only devices listed on the whitelist 164 are allowed to use the sub-client network 180.

In some embodiments, the memory 158 of the network access point 152 can include a token, such as a client network token 181. In some embodiments, the sub-client network profile 182 and/or the whitelist 164 can indicate whether the client network token 181 should be used by the guest UE 130 to interact with, make requests of, and/or control other devices connected to the network access point 152. The client network token 181 can be created by the network access application 160 based on the unique identifier 144 of the guest UE 130. In some embodiments, the network access package 172 can include the client network token 181. In some embodiments, if the client network token 181 is included within the network access package 172, then the client network token 181 can be used by the network connection application 142 of the guest UE 130 to enable contact with and/or control of other devices connected to the network access point 152, such as the host device 112 and/or the target UE 184. In some embodiments, only the guest UE 130 and the network access point 152 are privy to and/or store the client network token 181 so that that the guest UE 130 can levy commands on other devices connected to the client network 150 (e.g., the target UE 184), however, those other devices (e.g., the target UE 184) cannot levy commands on the guest UE 130. For example, in some embodiments, the target UE 184 can be configured as a smart television. Once the network access point 152 enables the guest UE 130 to access the sub-client network 180 and/or the client network 150, then the guest UE 130 can be used to create a UE command 183. The UE command 183 can instruct the target UE 184 to perform one or more output actions 188. Examples of output actions 188 can include, but should not be limited to, changing a media channel, pausing playback of content, muting audio content, skipping content, blocking content, rating content, powering the target UE 184 on and/or off, displaying media content, sending/receiving a file, sending a private communication for display on a user interface 186 of the target UE 184, a combination thereof, or the like. It is understood that the examples provided are for illustration purposes only, and therefore should not be construed as limiting in any way. In some embodiments, when the client network token 181 is provided to the guest UE 130, then the guest UE 130 can send the client network token 181 along with the UE command 183 to the target UE 184 via the network access point 152. Before the network access point 152 relays the UE command 183 to the target UE 184, the network access application 160 can identify whether the client network token 181 matches an instance of the client network token 181 for the guest UE 130 stored in one or more of the whitelist 164 and/or the sub-client network profile 182 of the memory 158. If the client network token 181 sent by the guest UE 130 is approved by the network access application 160, then the network access application 160 can relay the UE command 183 to target UE 184 via the client network 150.

In some embodiments, the sub-client network profile 182 can include the maximum time limit 167 so as to indicate a maximum amount of time that the guest UE 130 is authorized to use the sub-client network 180 and/or the client network 150. In some embodiments, access to one or more of the sub-client network 180 and/or the client network 150 can be revoked by the network access point 152, such as when the guest UE 130 has exceeded the maximum usage time indicated by the maximum time limit 167. In some embodiment, the host device 112 can revoke privileges granted to the guest UE 130, such as by revoking the ability of the guest UE 130 to send commands to the target UE 184, access the sub-client network 180, and/or access the client network 150. In some embodiments, revoking the privilege to command other devices can occur by the network access application 160 removing the client network token 181 from the sub-client network profile 182 and/or the whitelist 164. Therefore, if the guest UE 130 were to send the UE command 183 with the client network token 181 to the network access point 152, but the network access point 152 determines that an instance of the client network token 181 is not stored in and/or has been removed from, the sub-client network profile 182 and/or the whitelist 164, then the network access point 152 can prevent the UE command 183 from passing to the target UE 184. In some embodiments, the network access application 160 of the network access point 152 may require the guest UE 130 to satisfy a new and/or different set of corroborating conditions prior to the client network token 181 being reinstated within the sub-client network profile 182 and/or the whitelist 164.

FIG. 1 illustrates one provider network 102, one remote data store 104, one set of corroborating conditions 106, one blacklist 107, one voice signature file 109, one location sequence authentication string 108, one host user 110, one host device 112, one processor 114, one transceiver 116, one user interface 118, one memory 120, one voice interface application 122, one trigger response message 124, one network access request 126, one host voice input 123, one guest user 128, one guest voice input 129, one guest UE 130, one processor 132, one transceiver 134, one display 136, one user interface 138, one memory 140, one unique identifier 144, one network connection application 142, one location sequence identification 146, one reply message 148, one client network 150, one network access point 152, one processor 154, one transceiver 156, one memory 158, one network access application 160, one recognized device list 162, one whitelist 164, one guest UE identifier 166, one maximum time limit 167, one proximity time threshold 168, one identity verification request message 170, one network access package 172, one service set identifier 174, one access credential 176, one notification 202, one sub-client network 180, one client network token 181, one sub-client network profile 182, one UE command 183, one target UE 184, one user interface 186, and one set of output actions 188. It should be understood, however, that some implementations of the operating environment 100 can include zero, one, or more than one of these elements shown in FIG. 1. As such, the illustrated embodiment of the operating environment 100 should be understood as being illustrative, and should not be construed as being limiting in any way.

Figure 2A:
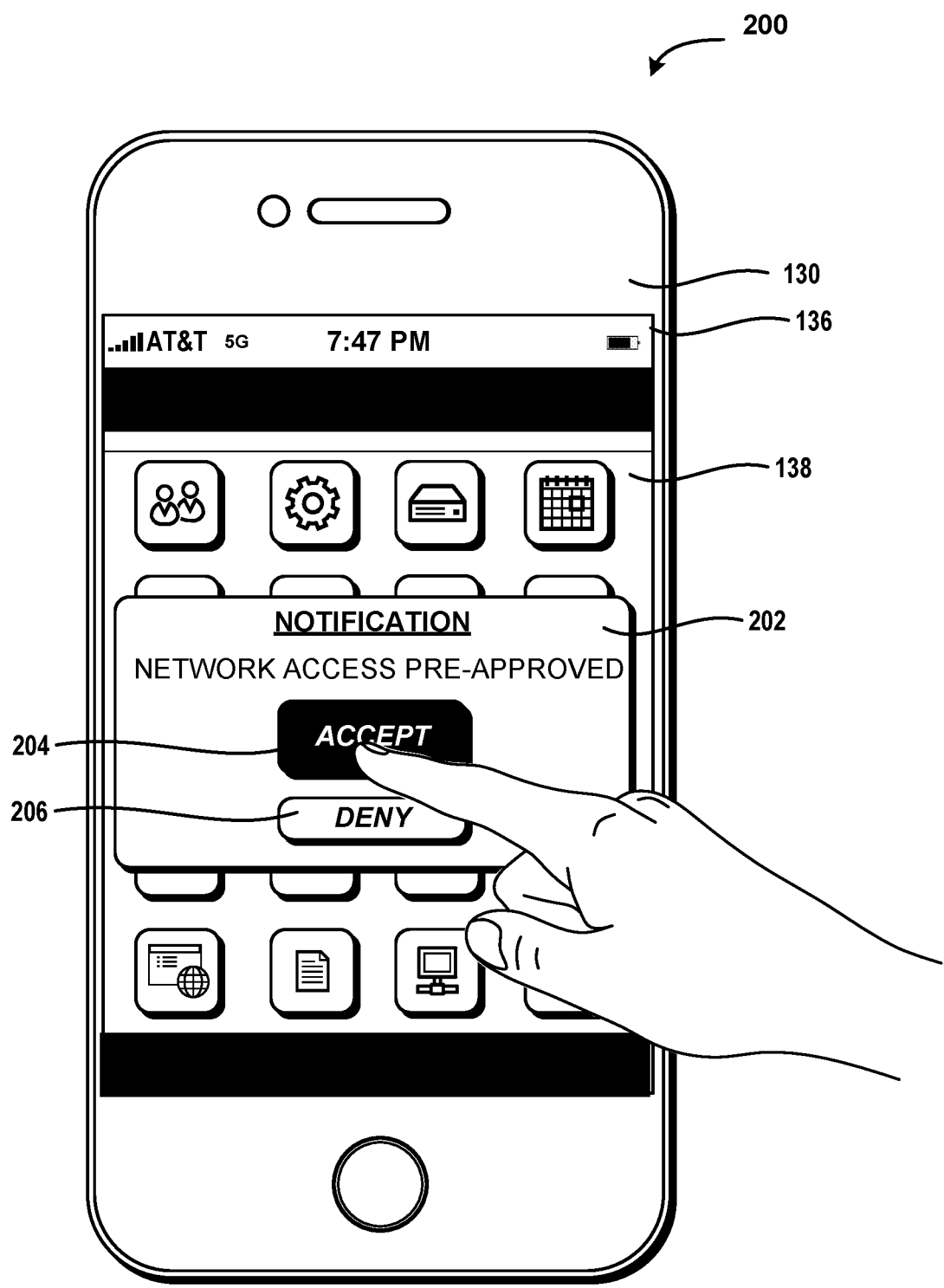
FIGS. 2A-2C are user interface diagrams illustrating various graphical user interfaces through which a guest user can access functions of a network according to various embodiments of the concepts and technologies disclosed herein.
Figure 2B:
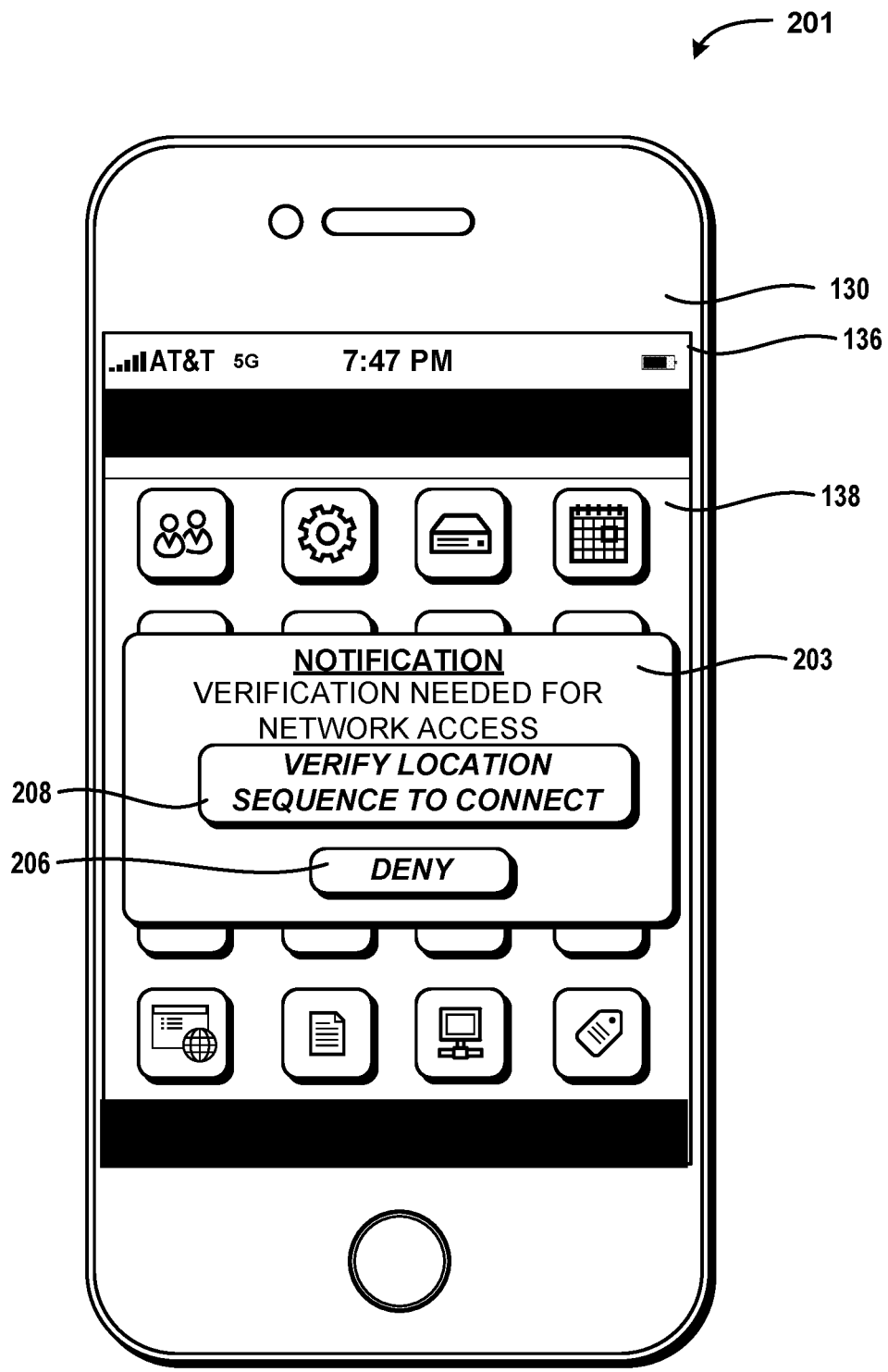
Figure 2C:
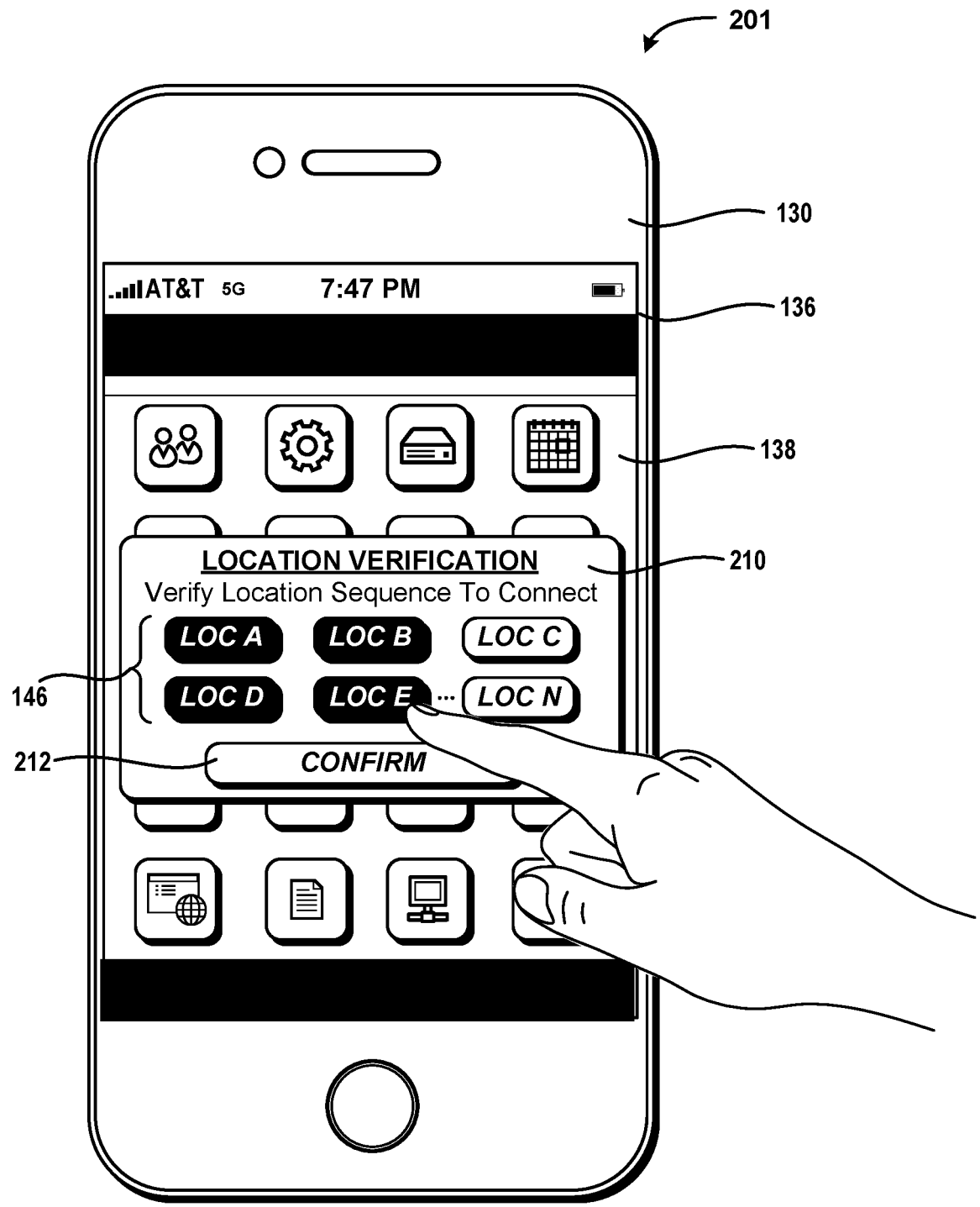

Turning now to FIG. 2A, with continued reference to FIG. 1, a graphical user interface 200 is illustrated according to an embodiment. In the illustrated example, the guest UE 130 is configured as a mobile communications device that includes the display 136 and an embodiment of the user interface 138. In an embodiment, the user interface 138 presents a notification 202 that can be included in the network access package 172 discussed above. The notification 202 can include selectable software buttons that are configured as triggers for different response and input options. For example, in an embodiment, the notification 202 can include a connection acceptance trigger button 204, and a connection rejection trigger button 206. In some embodiments, when the connection acceptance trigger button 204 is selected, the guest UE 130 can generate and send the reply message 148 that can include the access credentials 176, the service set identifier 174, and the unique identifier 144. The reply message 148 can cause the guest UE 130 to inform the network access point 152, via the reply message 148, that the guest UE 130 accepts the offer to connect with the network access point 152, thereby commencing communication via one or more of the client network 150, the provider network 102, and/or the sub-client network 180. In some embodiments, selection of the connection rejection trigger button 206 can cause the guest UE 130 to ignore the offer to connect from the network access point 152.

Turning now to FIGS. 2B-2C, with continued reference to FIG. 1, a graphical user interface 201 is illustrated according to an embodiment. In the illustrated example, the user interface 138 presents another embodiment of a notification 203. In some embodiments, the notification 203 can be provided to the guest UE 130 so that a location sequence can be verified as part of satisfying the corroborating conditions 106 prior to the network access point 152 allowing the guest UE 130 to access one or more of the networks, such as any of the provider network 102, the client network 150, and/or the sub-client network 180. In the illustrated embodiment, the notification 203 can include a location sequence verification button 208 and the connection rejection trigger button 206. Upon selection of the location sequence verification button 208 illustrated in FIG. 2B, the guest UE 130 can configure the user interface 138 to present a location verification notification 210, as illustrated in FIG. 2C. The location verification notification 210 can include a plurality of selectable options, such as illustrated as locations A-N. In an embodiment, the location verification notification 210 can allow a user to provide the location sequence identification 146 discussed above in FIG. 1. In some embodiments, the location verification notification 210 can allow a user to modify a name and/or geotag corresponding with the location sequence identification 146. In some embodiments, the network connection application 142 can combine the input of the location sequence identification 146 through the location verification notification 210 with one or more geocoordinates, geotags, addresses, or other indicators of one or more locations which the guest UE 130 has visited. Once the location sequence identification 146 has been selected via the location verification notification 210, a user can select a location confirmation button 212. Selection of the location confirmation button 212 can cause the guest UE 130 to send at least the location sequence identification 146 to the network access point 152, which in turn may be used to verify one or more corroborating conditions 106, such as discussed above with respect to FIG. 1. In some embodiments, the network access point 152 can allow the guest UE 130 to access one or more of the client network 150, the provider network 102, and/or the sub-client network 180 based on the particular input provided for the location sequence identification 146 within the location verification notification 210 illustrated in FIG. 2C. It is understood that the examples provided are for illustration purposes only, and therefore should not be construed as limiting the scope of the concepts and technologies disclosed herein.

Figure 3A:
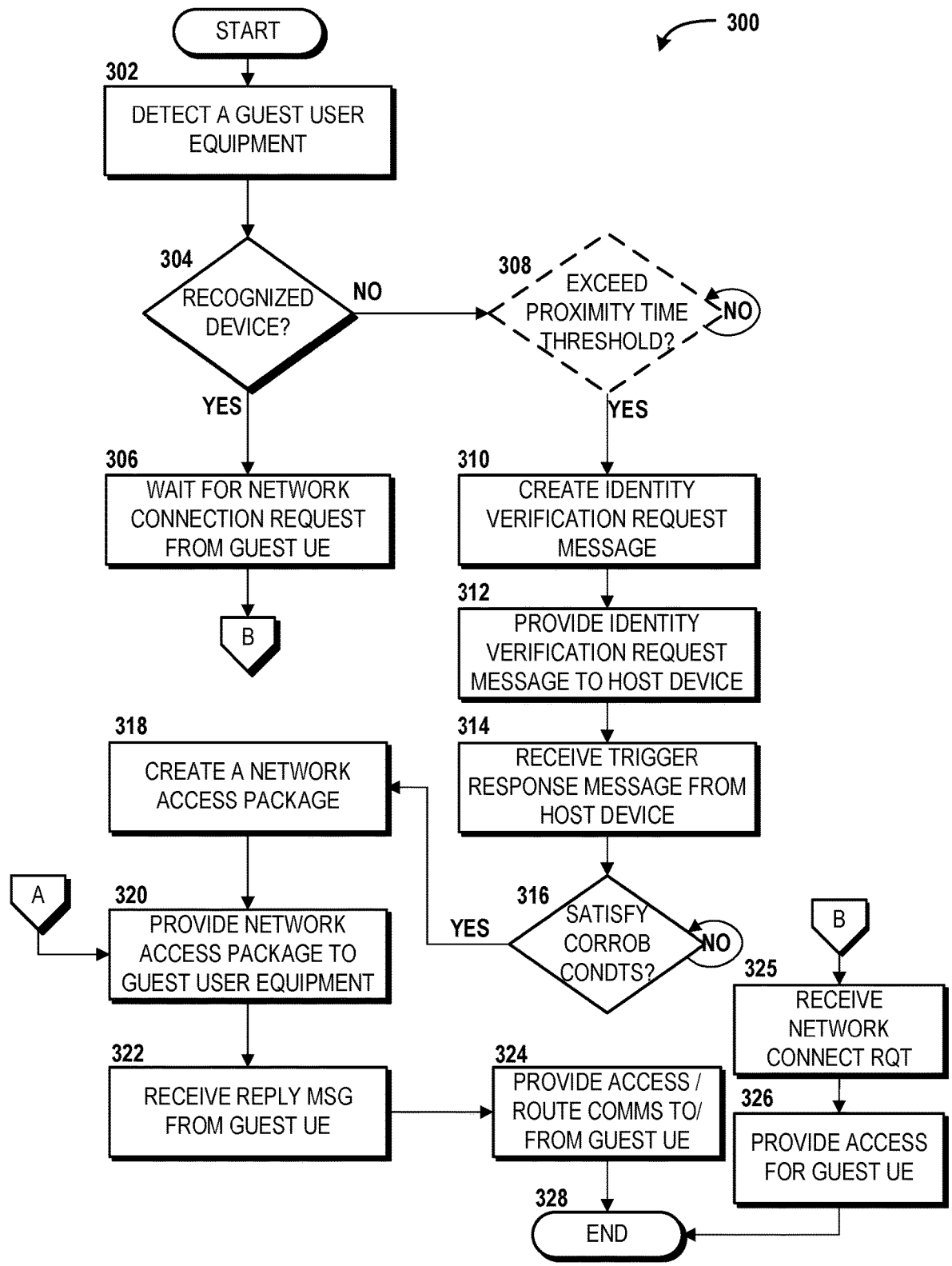
FIGS. 3A-3B are flow diagrams showing aspects of a method for providing network security control using a network access point, according to an illustrative embodiment of the concepts and technologies described herein.
Figure 3B:
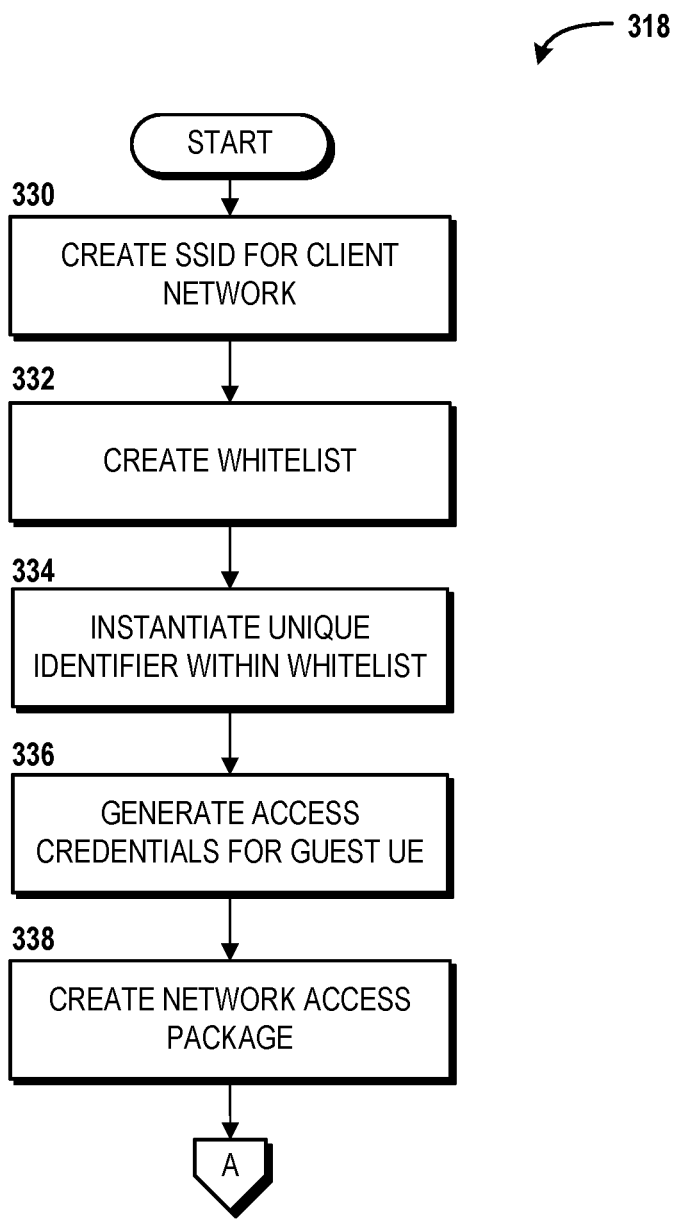

Turning now to FIGS. 3A and 3B, aspects of a method 300 for network security control for access to wireless radio networks will be described in detail, according to an illustrative embodiment. It should be understood that the operations of the one or more methods disclosed herein (e.g., the method 300 and/or a method 400 discussed below) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the network access point 152, the guest UE 130, and/or the host device 112, to perform one or more operations and/or causing the processor to direct other components of the computing system or device to perform one or more of the operations.

For purposes of illustrating and describing the concepts of the present disclosure, the methods disclosed herein are described as being performed by the network access point 152 via execution of one or more software modules such as, for example, the network access application 160 that configure one or more processors. It should be understood that additional and/or alternative devices and/or network nodes can, in some embodiments, provide the functionality described herein via execution of one or more modules, applications, and/or other software including, but not limited to, the host device 112 executing the voice interface application 122. Thus, the illustrated embodiments are illustrative, and should not be viewed as being limiting in any way. The method 300 will be described with reference to FIG. 1 and further reference to FIG. 2A.

The method 300 begins at operation 302, where the network access point 152 can detect the guest UE 130. The guest UE 130 can be detected based on the unique identifier 144 being broadcast to the network access point 152. From operation 302, the method 300 can proceed to operation 304, where the network access point 152 can determine whether the guest UE 130 is a recognized device. For example, the network access application 160 executing on the network access point 152 can use the unique identifier 144 of the guest UE 130 to compare with the recognized device list 162 that identifies a list of devices that are known to the network access point 152.

In an embodiment, the network access point 152 recognizes the guest UE 130, and the method 300 can proceed along the YES path to operation 306. At operation 306, the network access point 152 can wait for the guest UE 130 to send a network connection request. By waiting for the guest UE 130 to send a network connection request, in some embodiments, the network access point 152 may not act on behalf of the guest UE 130 to proactively authorize and/or allow the guest UE 130 connection and access to a network provided by the network access point 152, such as the client network 150. The method 300 can proceed from operation 306 to operation 325, where, in an embodiment, the network access point 152 can receive a network connection request that was initiated solely by the guest UE 130. In an embodiment, the method 300 can proceed from operation 325 to operation 326, where the network access point 152 can provide access for the guest UE 130 that was recognized from the recognized device list 162. From operation 326, the method 300 can proceed to operation 328, where the method 300 can end.

Returning to operation 304, in an embodiment, the network access point 152 can determine that the guest UE 130 is not a recognized device, such as by confirming that the unique identifier 144 is not found on the recognized device list 162. In response to determining that the guest UE 130 is not a recognized device, the method 300 can proceed along the NO path to operation 308. At operation 308, the network access point 152 can determine whether the guest UE 130 exceeds the amount of time for being in range of engaging in communication with the client network 150, which is indicated in the proximity time threshold 168. In an embodiment, the network access point 152 can determine that the amount of time that has passed since the guest UE 130 was first detected as being in range of communicating with the client network 150 has not exceeded the proximity time threshold 168. If the proximity time threshold 168 is not exceeded, then the method 300 can proceed along the NO path, which continues to perform operation 308 and check whether the proximity time threshold 168 has been exceeded. In an embodiment, in response to the network access point 152 determining that the proximity time threshold 168 has been exceeded, the method 300 can proceed from operation 308 to operation 310. It is understood that in some embodiments, the method 300 can proceed from operation 304 directly to operation 310.

At operation 310, the network access point 152 can create the identity verification request message 170. The identity verification request message 170 can be configured to seek approval from the host device 112 as to whether to grant the guest UE 130 access to the client network 150. In some embodiments, the identity verification request message 170 can instruct the host device 112 to obtain approval from the host user 110. From operation 310, the method 300 can proceed to operation 312, where the network access point 152 can provide the identity verification request message 170 to the host device 112. From operation 312, the method 300 can proceed to operation 314, where the network access point 152 can receive the trigger response message 124 from the host device 112. The trigger response message 124 can indicate approval from the host device 112 for allowing the guest UE 130 access to the client network 150. In some embodiments, the trigger response message 124 can include the network access request 126 that was generated by the host device 112 and sent to the network access point 152 on behalf of the guest UE 130. By this, the guest UE 130 does not initiate a request to gain access to the client network 150 (or any other network operated by the network access point 152) due to the network access request 126 being sent by the host device 112 to the network access point 152 on behalf of the guest UE 130.

From operation 314, the method 300 can proceed to operation 316, where the network access point 152 can determine whether the guest UE 130 satisfies one or more corroborating conditions, such as one or more of the corroborating conditions 106. For example, in some embodiments, the network access point 152 may require that the guest UE 130 satisfy zero, one, or more than one of the corroborating conditions 106 prior to being granted access to the client network 150. Examples of the guest UE 130 satisfying the corroborating condition 106 can include, but should not be limited to, one or more of authentication of a voice signature detected by the host device 112, verification that the guest UE 130 has visited a defined sequence of locations, verification that the guest UE 130 is not on the blacklist 107 in a remote data store 104, a combination thereof, or the like. The voice signature can be detected by the host device 112 receiving the guest voice input 129, which can be sent to the network access point 152 to compare with the voice signature file 109. The verification that the guest UE 130 has visited a defined sequence of locations can be obtained by the network access point 152 sending a notification to the guest UE 130 that requests location sequence information (e.g., the LSID 146) be sent to the network access point 152, such as illustrated in the embodiments discussed with respect to FIGS. 2B-2C. The LSID 146 can be compared with the location sequence authentication string 108 in order to verify that one or more locations has been visited by the guest UE 130. In some embodiments, verification that the guest UE 130 is not on the blacklist 107 can be determined by the network access point 152 confirming that the blacklist 107 does not include the unique identifier 144 associated with the guest UE 130. In some embodiments, when the guest UE 130 does not satisfy one, more than one, and/or all of the corroborating conditions, then the method 300 can proceed along the NO path where the network access point 152 can wait and continue to check until the guest UE 130 satisfies one, more than one, and/or all of the corroborating conditions 106. In an embodiment where the guest UE 130 satisfies one, more than one, and/or all of the corroborating conditions 106, then the method 300 can proceed along the YES path to operation 318. At operation 318, the network access point 152 can, in an embodiment, perform a process shown in FIG. 3B to create a network access package, such as the network access package 172, that can provide the guest UE 130 with access credentials to access the client network 150.

Turning briefly to FIG. 3B, the network access point 152, at operation 330, can create a service set identifier for the client network 150, such as the service set identifier 174, according to an embodiment. From operation 330, the method 300 can proceed to operation 332, where the network access point 152 can create the whitelist 164 that can, in some embodiments, correspond with the service set identifier 174 for the client network 150. From operation 332, the method 300 can proceed to operation 334, where the network access point 152 can instantiate the unique identifier 144 within the whitelist 164, such as by creating and storing the guest UE identifier 166 within the whitelist 164, where the guest UE identifier 166 can include a copy of the unique identifier 144. From operation 334, the method 300 can proceed to operation 336, where the network access point 152 can generate the access credentials 176 for the guest UE 130 to use in accessing and communicating with the client network 150. From operation 336, the method 300 can proceed to operation 338, where the network access point 152 can create the network access package 172 that can include, for example, one or more of the access credentials 176, the notification 202 that indicates the guest UE 130 is authorized to use the client network 150, and can also include the connection acceptance trigger button 204 that, upon selection, instructs the guest UE 130 to send the reply message 148 to the network access point 152 using the access credentials 176. From operation 338, the process 318 of creating an embodiment of the network access package 172 can end and proceed to operation 320.

Returning to FIG. 3A, the method 300 can continue from operation 318 to operation 320, where the network access point 152 can provide the network access package 172 to the guest UE 130, such as via the communication path 2. From operation 320, the method 300 can proceed to operation 322, where the network access point 152 can receive the reply message 148 from the guest UE 130. The reply message 148 can include the access credentials 176 that were sent in the network access package 172. In some embodiments, the reply message 148 also can include the unique identifier 144 of the guest UE 130. From operation 322, the method 300 can proceed to operation 324, where the network access point 152 can provide access for the guest UE 130 to use the client network 150 based on the reply message 148 including the access credentials 176. By this, the guest UE 130 can communicate over the client network 150 via the network access point 152. It is understood that the examples provided herein are for illustration purposes only, and therefore should not be construed as limiting in any way. From operation 324, the method 300 can proceed to operation 328, where the method 300 can end.

Figure 4A:
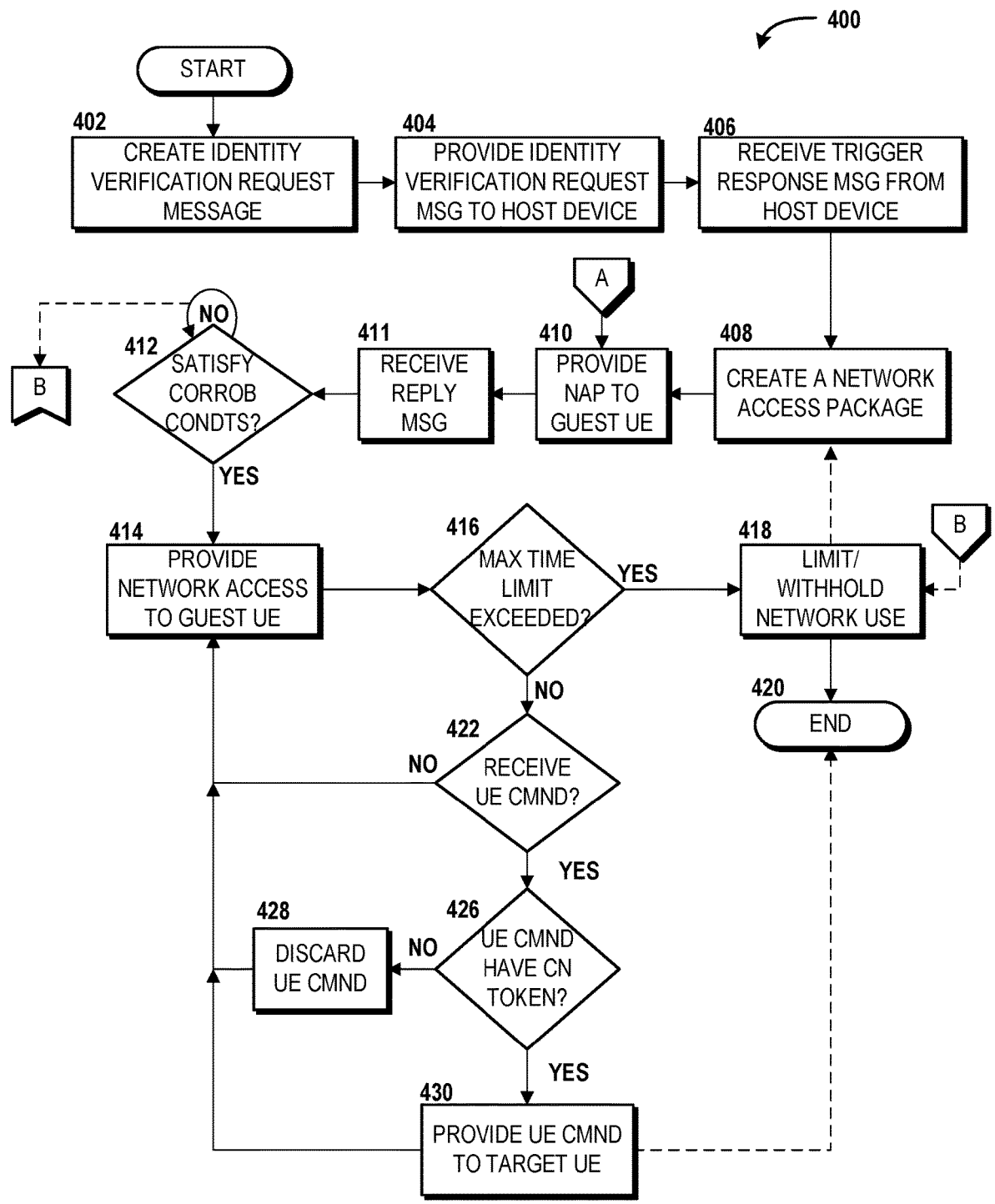
FIGS. 4A-4B are flow diagrams showing aspects of another method for providing network security control using a network access point, according to another illustrative embodiment of the concepts and technologies described herein.
Figure 4B:
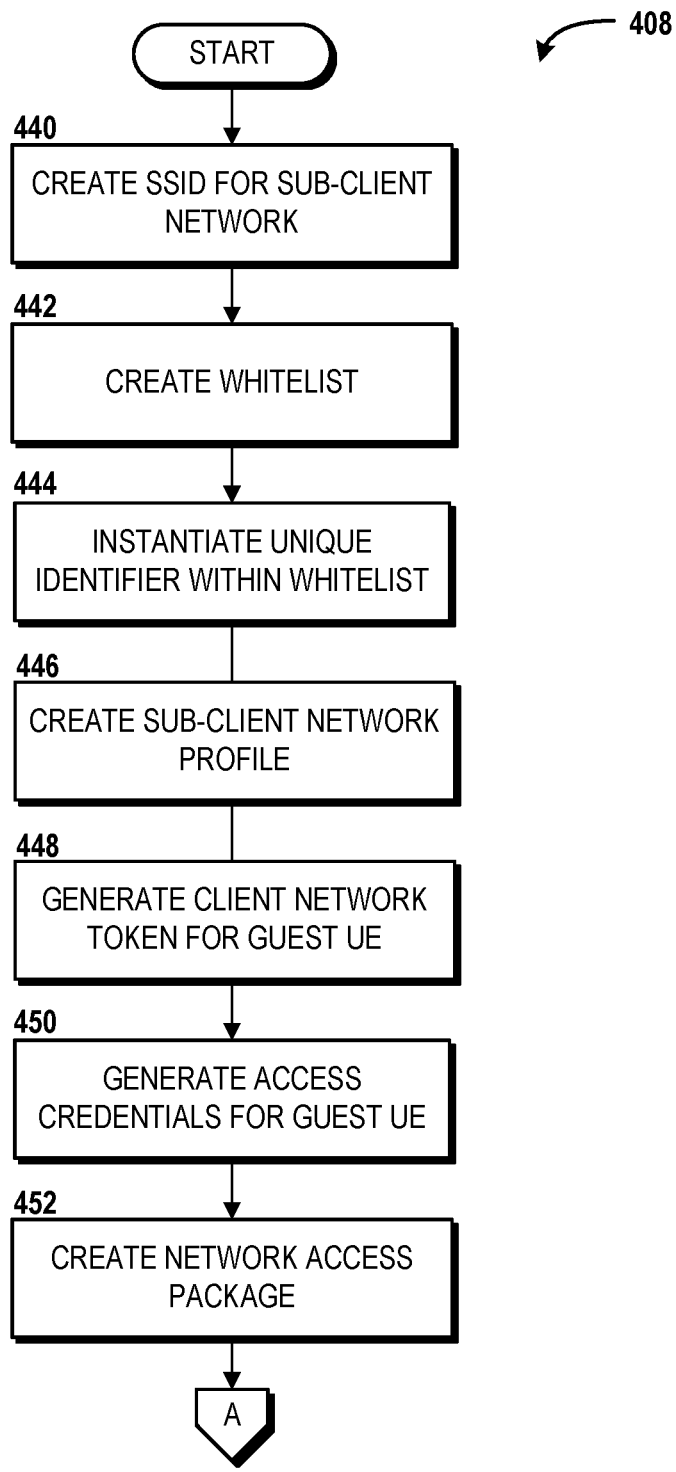

Turning now to FIGS. 4A-4B, a method 400 for network security control for access to wireless radio networks will be described, according to another illustrative embodiment of the concepts and technologies disclosed herein. The method 400 will be described with additional reference to FIG. 1 and FIGS. 2B-2C. The method 400 assumes that the network access point 152 has already detected the guest UE 130, determined that the guest UE 130 is not a recognized device, and in some embodiments, determined that the proximity time threshold 168 has been exceeded, such as discussed with respect to operations 302, 304, and 308 in the method 300. The method 400 begins and proceeds to operation 402, where the network access point 152 can create the identity verification request message 170. The identity verification request message 170 can include the unique identifier 144 so as to indicate to the host device 112 and the host user 110 the presence of the guest UE 130 in relation to the network access point 152. From operation 402, the method 400 can proceed to operation 404, where the identity verification request message 170 is provided to the host device 112. The identity verification request message 170 can be configured to instruct the host device 112 to seek an approval or rejection from the host user 110 so as to know whether to allow or deny the guest UE 130 access to one or more networks of the network access point 152, such as one or more of the client network 150, the sub-client network 180, and/or the provider network 102. The host user 110 can provide the host voice input 123 that, in some embodiments, indicates approval to allow the guest UE 130 access to use the network access point 152. In some embodiments, the host voice input 123 may not indicate which network the guest UE 130 should be allowed to join, but rather may simply indicate approval. The voice interface application 122 can transform the host voice input 123 into the trigger response message 124 that can include the network access request 126 that is created on behalf of the guest UE 130. From operation 404, the method 400 can proceed to operation 406, where the network access point 152 can receive, from the host device 112 via the communication path 2, the trigger response message 124 that includes the network access request 126. From operation 406, the method 400 can proceed to operation 408, where the network access point 152 can execute a process shown in FIG. 4B to create a network access package, such as an embodiment of the network access package 172.

Turning briefly to FIG. 4B, the network access point 152 can, at operation 440, create a service set identifier, such as the service set identifier 174. In some embodiments, the service set identifier 174 can be specifically created for, and unique to, the sub-client network 180. For example, in some embodiments, the service set identifier 174 can be created specifically for the guest UE 130 to represent the sub-client network 180. In some embodiments, the client network 150 may be a hidden network that does not report a service set identifier to the guest UE 130, and therefore only the sub-client network 180 becomes visible to the guest UE 130 via the service set identifier 174. In some embodiments, the service set identifier 174 is generated based on the unique identifier 144 of the guest UE 130, such as by notifying the guest UE 130 that the sub-client was specifically for their use, and in some embodiments only for their use. For example, in an embodiment, the service set identifier 174 can be broadcast for display on the guest UE 130 as "NetworkForGuestUEidentification", or another text indicator that the sub-client network 180 has been and/or will be uniquely created for use by (only) the guest UE 130. In some embodiments, when multiple guest UE's are present, the method 400 can be performed for more than one and/or each guest UE, thereby enabling each guest UE access to their own sub-client network. In some embodiments, the service set identifier 174 corresponds with the sub-client network 180, but the sub-client network 180 remains hidden from view for all other devices except for the guest UE 130. For example, in an embodiment, the network access point 152 may hide the sub-client network 180 from public broadcast and send the service set identifier 174 only to the guest UE 130 so that it appears to the guest UE 130 but does not appear for other guest devices. In some embodiments, this may be accomplished by the network access point 152 initiating a beamforming routine that targets broadcast of the service set identifier 174 to the guest UE 130, and exposes the sub-client network 180 to the guest UE 130. It is understood that the examples provided are for illustrative purposes only, and therefore should not be construed as limiting the scope of the concepts and technologies disclosed herein.

From operation 440, the process 408 can proceed to operation 442, where the network access point 152 can create the whitelist 164. In some embodiments, the whitelist 164 can correspond with the service set identifier 174 associated with the sub-client network 180. From operation 442, the process 408 can proceed to operation 444, where the network access application 160 of the network access point 152 can instantiate the unique identifier 144 associated with the guest UE 130 within the whitelist 164. From operation 444, the process 408 can proceed to operation 446, where the network access point 152 can create the sub-client network profile 182. The sub-client network profile 182 can be associated with the sub-client network 180 and include information about the sub-client network 180. In some embodiments, the sub-client network profile 182 can include the whitelist 164 and the maximum time limit 167 indicating the length of time that the guest UE 130 is allowed to maintain connection with the sub-client network 180 during a single network session before reauthorization is required form the host device 112. Reauthorization can be provided by resending the identity verification request message 170 to the host device 112 and the host device 112 responding with the trigger response message 124 that includes the network access request 126.

From operation 446, the process 408 can proceed to operation 448, where the network access point 152 can generate the client network token 181 for the guest UE 130. In some embodiments, the sub-client network profile 182 can include the client network token 181 that can allow the guest UE 130 to contact and/or control devices on the client network 150, such as one or more of the target UE 184 and/or the host device 112. The client network token 181 can be stored within the sub-client network profile 182 for comparison purposes when the guest UE 130 seeks to send a command, such as the UE command 183, to a device on the client network 150, such as the target UE 184. From operation 448, the process 408 can proceed to operation 450, where the network access point can generate the access credentials 176 for the guest UE 130. In some embodiments, the access credentials 176 correspond with the sub-client network 180 and not the client network 150. By this, the network access point 152 can isolate the guest UE 130 to use the sub-client network 180 and monitor the communications passing to and/or from the guest UE 130 via the sub-client network 180. The network access point 152 can allow communications to/from the guest UE 130 to pass via the client network 150 and the provider network 102 based on the guest UE 130 providing the access credentials 176 to the network access point 152. In some embodiments, the access credentials 176 and the client network token 181 are required from the guest UE 130 in order for the guest UE 130 to send commands, such as the UE command 183, to devices on the client network 150, such as the target UE 184 and/or the host device 112. From operation 450, the process 408 can proceed to operation 452, where the network access point 152 can create the network access package 172 for the guest UE 130. In some embodiments, the network access package 172 can include the service set identifier 174 associated with the sub-client network 180, the access credentials 176, the client network token 181, and a notification, such as any of the notifications 202, 203, and/or 210. The network access package 172 can instruct the guest UE 130 to send the reply message 148 back to the network access point 152, where the reply message 148 can include the access credentials 176, the client network token 181, the LSID 146, the unique identifier 144, and any input from one or more of the notifications 202, 203, and/or 210 discussed with respect to FIGS. 2A-2C. For example, in some embodiments, the notifications 203, 210 can allow the guest UE 130 to send the LSID 146 to the network access point 152, and the notification 202 can instruct the guest UE to create and send the reply message 148. In some embodiments, each of the notifications 202, 203, and 210 can be present sequentially and/or concurrently on the user interface 138 of the guest UE 130. As such, the examples illustrated in FIGS. 2A-2C are for illustration purposes only, and should not be construed as limiting the scope of the embodiments in any way. From operation 452, the process 408 can end and proceed to operation 410, which is illustrated on FIG. 4A.

Turning back to FIG. 4A, the method 400 can proceed to operation 410, where the network access point 152 can provide the network access package 172 to the guest UE 130, such as via the communication path 2. The guest UE 130 can receive the network access package 172 and present one or more of the notifications 202, 203, and/or 210 on the user interface 138 of the guest UE 130. The guest UE 130 can create the reply message 148 that can include any of the access credentials 176, the client network token 181, the unique identifier 144, and the LSID 146. From operation 410, the method 400 can proceed to operation 411, where the network access point 152 can receive the reply message 148 from the guest UE 130. From operation 411, the method 400 can proceed to operation 412, where the network access point 152 can determine whether guest UE 130 has satisfied one or more corroborating conditions 106. In some embodiments, the sub-client network profile 182 can indicate whether the guest UE 130 is required to satisfy one or more of corroborating conditions 106 before access to the sub-client network 180 and/or the client network 150 is granted. For example, the corroborating conditions 106 can include one or more of authentication of a voice signature that can be detected by the host device 112, verification that the guest UE 130 has visited a defined sequence of locations, verification that the guest UE 130 is not on a blacklist in a remote datastore, a combination thereof, or the like. The network access point 152 can authenticate a voice signature of the guest user 128 that can be detected by the host device 112 and/or the guest UE 130 by receiving a message that includes the guest voice input 129 and comparing the guest voice input 129 with the voice signature file 109 stored in the remote data store 104. If the guest voice input 129 matches the voice signature file 109, then one of the corroborating conditions 106 corresponding to authentication of the voice signature has been satisfied. The network access point 152 can verify that the guest UE 130 has visited a defined sequence of locations by comparing the LSID 146 from the guest UE 130 with the location sequence authentication string 108 in the remote data store 104. If the LSID 146 matches the location sequence authentication string 108, then one of the corroborating conditions 106 corresponding to verification that the guest UE 130 has visited a defined sequence of locations has been satisfied. The network access point 152 can verify that the guest UE 130 is not on a blacklist in a remote datastore by confirming that the unique identifier 144 is not present within the blacklist 107 stored in the remote data store 104, thereby satisfying one of the corroborating conditions 106. In some embodiments, if one, more than one, and/or all of the corroborating conditions 106 are not satisfied, then the method 400 can proceed along the NO path and continue to check whether has verified one or more of the corroborating conditions 106.

In further embodiments, if one, more than one, and/or all of the corroborating conditions 106 are not satisfied, then the method 400 can proceed along the NO path to operation 418, where the network access point 152 can limit or otherwise withhold communication routing for the guest UE 130, thereby preventing the guest UE 130 from using and accessing one or more of the sub-client network 180, the client network 150, and/or the provider network 102. In an embodiment, the method 400 can proceed from operation 418 to operation 420, where the method 400 can end. In some embodiments, the method 400 can proceed from operation 418 to operation 408, where the network access point 152 can create a new instance of the network access package 172 so as to allow the guest UE 130 another attempt at gaining access to one or more networks. It is understood that the examples provided are for illustration purposes only, and therefore should not be construed as limiting the scope of the concepts and technologies disclosed herein.

In some embodiments, if one, more than one, and/or all of the corroborating conditions 106 are satisfied, then the method 400 can proceed along the YES path from operation 412 to operation 414, where the network access point 152 can provide the guest UE 130 with access to one or more network (e.g., the sub-client network 180, the client network 150, and/or the provider network 102) by routing communications to/from the guest UE 130. From operation 414, the method 400 can proceed to operation 416, where the network access point 152 can identify the maximum time limit 167 within the sub-client network profile 182 and determine whether the guest UE 130 has been connected to the sub-client network 180 longer than the time allotted by the maximum time limit, thereby exceeding the maximum time limit 167.

In an embodiment, the network access point 152 can determine that the guest UE 130 has been connected and using the sub-client network 180 longer than the maximum time limit 167, thereby exceeding the maximum time limit 167, which causes the method 400 to proceed along the YES path to operation 418. At operation 418, the network access point 152 can limit the guest UE 130 from using the sub-client network 180 and/or the client network 150 by revoking or otherwise removing the unique identifier 144 (and/or the guest UE identifier 166 which is a copy of the unique identifier 144) from the whitelist 164, thereby preventing the guest UE 130 from using a network.

In an embodiment, the network access point 152 can determine that the guest UE 130 has not been connected and using the sub-client network 180 longer than the maximum time limit 167, thereby not exceeding the maximum time limit 167, which causes the method 400 to proceed along the NO path from operation 416 to operation 422. At operation 422, the network access point 152 can determine whether the guest UE 130 has sent a command, such as the UE command 183, that can instruct the target UE 184 to perform an output action 188. If the network access point 152 determines that the guest UE 130 has not sent a command, then the method 400 can proceed along the NO path to operation 414 where the network access point 152 can continue to provide the guest UE 130 with access to a network. If the network access point 152 determines that the guest UE 130 has sent a command which is received by the network access point 152, then the method 400 can proceed along the YES path to operation 426 where the network access point 152 can determine whether the client network token 181 has been included with the UE command 183. The client network token 181 can be used to ensure that the guest UE 130 is authorized to send commands to one or more devices connected to the client network 150.

In some embodiments, if the client network token 181 is not provided with the UE command 183, then the method 400 can proceed along the NO path to operation 428, where the network access point 152 can discard the UE command 183, thereby preventing the UE command 183 from being sent to the target UE 184 for which the UE command 183 is intended. From operation 428, the method 400 can proceed to operation 414, where the network access point 152 can continue to provide network access and communication routing for the guest UE 130.

In some embodiments, if the client network token 181 is provided with the UE command 183, then the method 400 can proceed from operation 426 to operation 430, where the network access point 152 can route the UE command 183 from the sub-client network 180, through the client network 150, to the target UE 184 based on the UE command 183 being intended for the target UE 184. The UE command 183 can be received by the target UE 184, which can execute and perform one or more output actions 188 based on the instructions of the UE command 183. In some embodiments, the method 400 can proceed from operation 430 to operation 414, where the network access point 152 can continue to provide network access and communication routing for the guest UE 130. In some embodiments, the method 400 can proceed from operation 430 to operation 420, where the method 400 can end.

Figure 5:
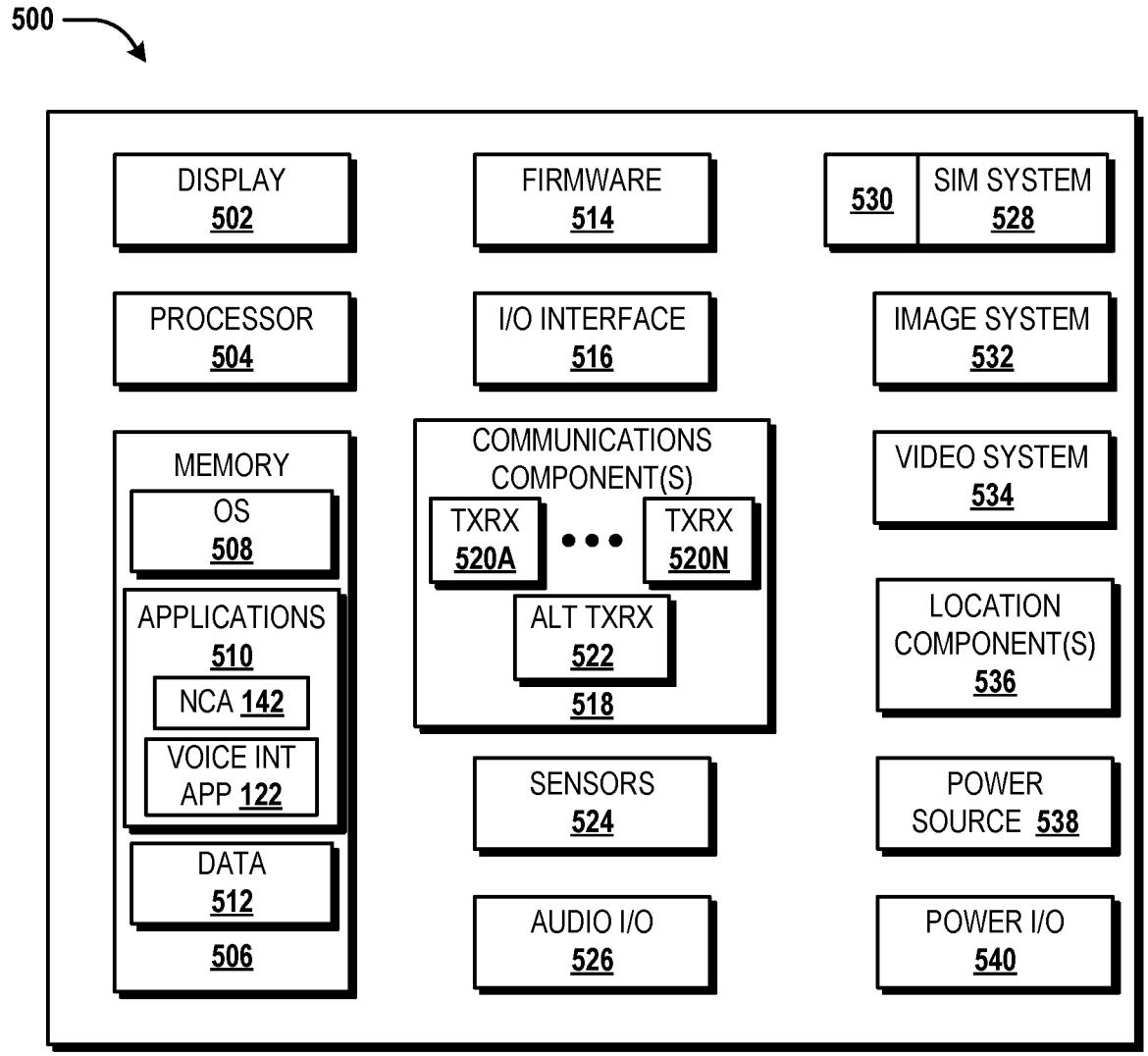
FIG. 5 is a block diagram illustrating an example user equipment capable of implementing aspects according to embodiments of the concepts and technologies described herein.

Turning now to FIG. 5, an illustrative user equipment 500 and components thereof will be described. In some embodiments, one or more of the host device 112, guest UE 130 and/or the target UE 184 (shown in FIG. 1) can be configured like the user equipment 500. It is understood that the user equipment 500 can be configured to take the form of a mobile communication device, a tablet, a wearable computing device, a heads-up display computer system, an augmented reality ("AR") device, a virtual reality ("VR" device, a vehicle computing system, an attachable computing device, a camera, an appliance (e.g., a refrigerator, an oven, a microwave, etc.), a television, a handheld device, a combination thereof, or other user equipment that can implement network communications. It is understood that the examples discussed above are used for illustration purposes only, and therefore should not be construed to limit the scope of the disclosure in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the user equipment 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The user equipment 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the user equipment 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting or otherwise entering/deleting data, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the user equipment 500. The data 512 can include, for example, one or more identifiers, and/or other applications or program modules. In some embodiments, the data 512 can include one or more of the network access package 172, the unique identifier 144, the LSID 146, and the UE command 183 and/or other data sent among and/or between the guest UE 130, the target UE 184, the host device 112, and the network access point 152. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the network connection application 142 and the voice interface application 122. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The user equipment 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the user equipment 500 can be configured to synchronize with another device to transfer content to and/or from the user equipment 500. In some embodiments, the user equipment 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the user equipment 500 and a network device or local device.

The user equipment 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the user equipment 500 may be provided by an audio I/O component 526. The audio I/O component 526 of the user equipment 500 can include one or more speakers for the output of audio signals, one or more microphones for the collection and/or input of audio signals, and/or other audio input and/or output devices, which in some embodiments, can be used to capture one or more of the guest voice input 129 and/or the host voice input 123.

The illustrated user equipment 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the user equipment 500 are contemplated, it should be understood that these embodiments are illustrative, and should not be construed as being limiting in any way.

The user equipment 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The user equipment 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The user equipment 500 also can include one or more location components 536. The location components 536 can be configured to send and/or receive signals to determine a geographic location of the user equipment 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the user equipment 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the user equipment 500. Using the location component 536, the user equipment 500 can generate and/or receive data to identify its geographic location (e.g., the LSID 146), or to transmit data used by other devices to determine the location of the user equipment 500. The location component 536 may include multiple components for determining the location and/or orientation of the user equipment 500.

The illustrated user equipment 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the user equipment 500 can include additional and/or alternative components, the above embodiment should be understood as being illustrative of one possible operating environment for various embodiments of the concepts and technologies described herein. The described embodiment of the user equipment 500 is illustrative, and should not be construed as being limiting in any way.

Figure 6:
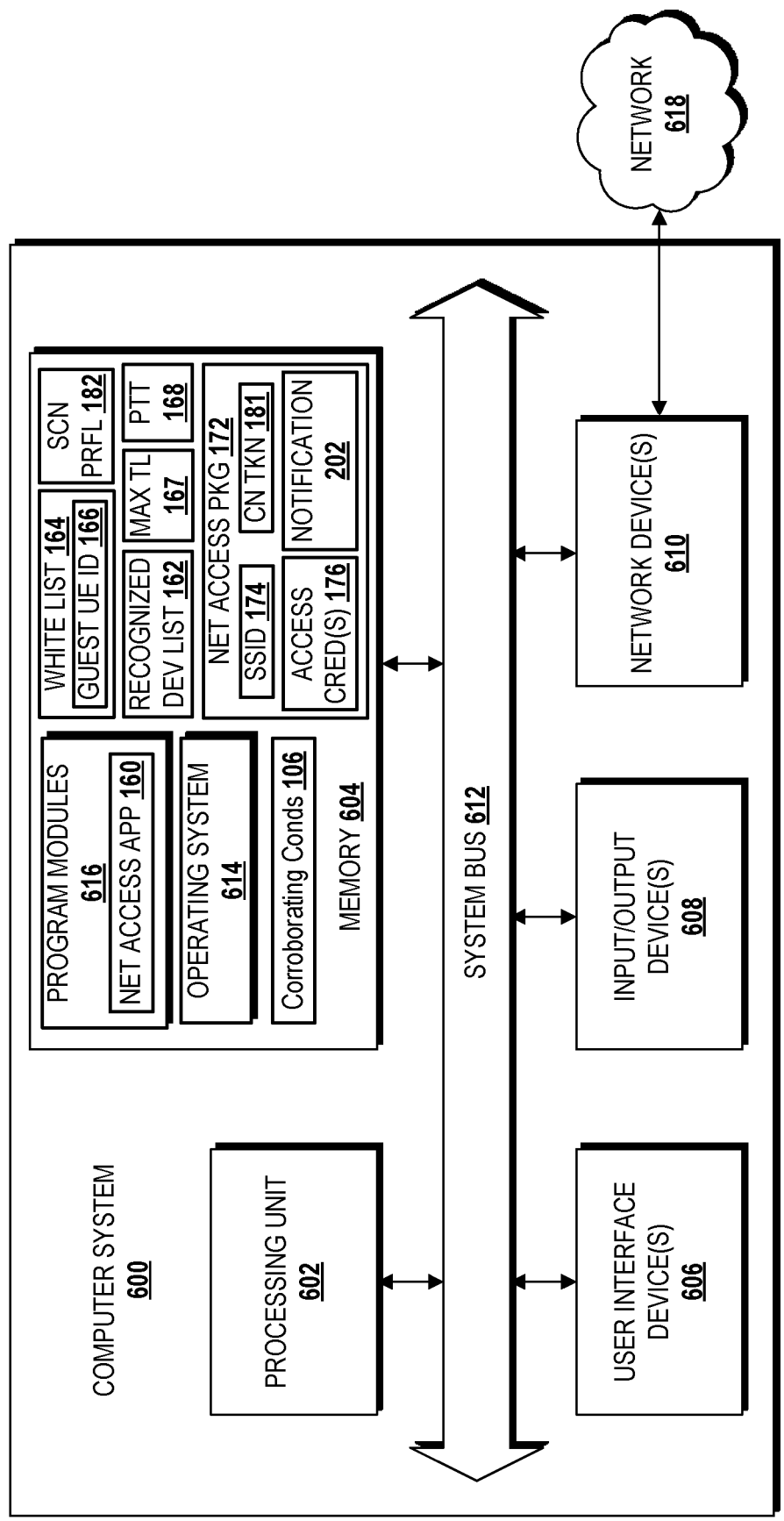
FIG. 6 is a block diagram illustrating an example computer system configured to provide, implement, and execute operations according to at least some illustrative embodiments of the concepts and technologies described herein.

Turning now to FIG. 6 is a block diagram illustrating a computer system 600 configured to provide the functionality in accordance with various embodiments of the concepts and technologies disclosed herein. The systems, devices, and other components disclosed herein can utilize, at least in part, an architecture that is the same as or at least similar to the architecture of the computer system 600. In some embodiments, one or more of the network access point 152 and/or the remote data store 104 can be configured like the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. In some embodiments, for example, the program modules 616 can include the network access application 160 and/or other program modules. These and/or other programs can be embodied in computer-readable medium including instructions that, when executed by the processing unit 602, in some embodiments, may perform and/or facilitate performance of one or more of the operations discussed with respect to FIGS. 1, 2A-2C, the methods 300, and the method 400, described in detail above with respect to FIGS. 3A, 3B, 4A, and 4B. According to some embodiments, the program modules 616 may be embodied in hardware, software, firmware, or any combination thereof. In some embodiments, the memory 604 also can be configured to store the corroborating conditions 106, the whitelist 164, the sub-client network profile 182, the recognized device list 162, the maximum time limit 167, the proximity time threshold 168, the network access package 172, the service set identifier 174, the client network token 181, the access credentials 176, the notification 202, the notification 203, the location verification notification 210, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618, such as the provider network 102, the client network 150, and/or the sub-client network 180. Examples of the network devices 610 include, but are not limited to, a modem, a radio frequency ("RF") or infrared ("IR") transceiver, a telephonic interface, a bridge, a router, or a network card. The network 618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 7:
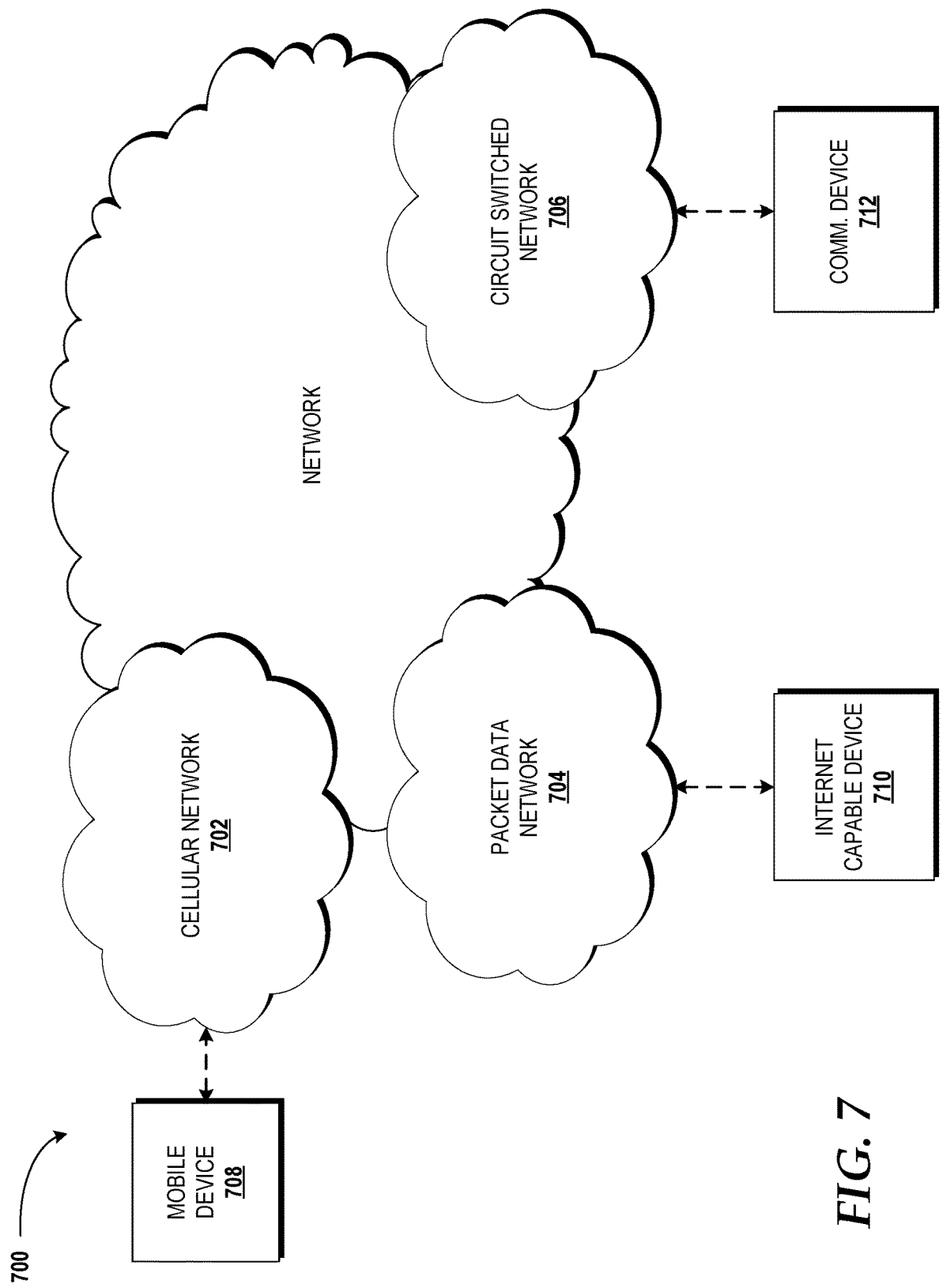
FIG. 7 is a block diagram illustrating an example network capable of implementing aspects of the concepts and technologies described herein.

Turning now to FIG. 7, details of a network 700 are illustrated, according to an illustrative embodiment. In some embodiments, one or more of the provider network 102, the client network 150, and/or the sub-client network 180 can be configured, at least in part, as the network 700. The network 700 includes a cellular network 702, a packet data network 704, for example, the Internet, and a circuit switched network 706, for example, a PSTN. The cellular network 702 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706. In some embodiments, the provider network 102 of FIG. 1 can operate as the packet data network 704, and the client network 150 and sub-client network 180 can operate in cooperation with the cellular network 702.

The mobile communications device 708, such as, for example, a cellular telephone, a mobile terminal, a PDA, a laptop computer, a handheld computer, and combinations thereof, can be operatively connected to the cellular network 702. In some embodiments, one or more of the guest UE 130, the host device 112, and/or the target UE 184 can be configured as the mobile communications device 708. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSDPA), and HSPA+. The cellular network 702 also is compatible with 4G and 5G mobile communications standards such as LTE, or the like, as well as evolved and future mobile standards, including but not limited to LTE-Advanced, LTE-Advanced Pro and 5G.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. In some embodiments, the at least some of the provider network 102 can be configured as a packet data network, such as the packet data network 704. The circuit switched network 706 includes various hardware and software for providing circuit switched communications. The circuit switched network 706 may include, or may be, what is often referred to as a POTS. In some embodiments, the at least some of the provider network 102 also can be configured as a circuit switched network, such as the circuit switched network 706. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network of FIG. 7 is used to refer broadly to any combination of the networks 702, 704, 706 shown in FIG. 7. It should be appreciated that, in some embodiments, substantially all of the functionality described with reference to the provider network 102, the client network 150, and/or the sub-client network 180 can be performed by the cellular network 702, the packet data network 704, and/or the circuit switched network 706, alone or in combination with other networks, network elements, and the like, according at least to aspects of the features and operations discussed herein.

Based on the foregoing, it should be appreciated that concepts and technologies directed to network service control for access to wireless radio networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A network access point comprising:
a processor; and
a memory that stores computer-executable instructions that, in response to execution by the processor, cause the processor to perform operations comprising:
    detecting a unique identifier of a guest user equipment being broadcast from the guest user equipment,
    determining, based on the unique identifier of the guest user equipment, that the guest user equipment is not a recognized device,
    in response to determining that the guest user equipment is not a recognized device, creating an identity verification request message that seeks approval from a host device to allow the guest user equipment access to a client network provided by the network access point, wherein the network access point is communicatively coupled to the host device and is controlled, at least in part, by the host device, and wherein the host device is associated with a host user,
    providing the identity verification request message to the host device,
    receiving a trigger response message from the host device created by the host device in response to the host user granting the guest user equipment access to the client network via the network access point, wherein the trigger response message created by the host device includes a network access request generated by the host device on behalf of the guest user equipment such that the guest user equipment does not initiate a network access request to gain access to the client network via the network access point,
    determining that the guest user equipment satisfies corroborating conditions, wherein the corroborating conditions include verification that the guest user equipment has visited a defined sequence of locations,
    creating, based at least in part on receiving the trigger response message and on the guest user equipment satisfying the corroborating conditions, a network access package that provides the guest user equipment with access credentials to access the client network, and
    providing the network access package to the guest user equipment.

2. The network access point of claim 1, wherein the operations further comprise determining that the guest user equipment exceeds a proximity time threshold for being in range of engaging in communication with the client network.

3. The network access point of claim 2, wherein creating the identity verification request message is further in response to determining that the guest user equipment exceeds the proximity time threshold.

4. The network access point of claim 1, wherein creating the network access package includes:
creating a service set identifier for the client network;
creating a whitelist corresponding to the service set identifier for the client network;
instantiating the unique identifier of the guest user equipment within the whitelist;
generating access credentials for the guest user equipment; and
creating the network access package that includes the access credentials, a notification that the guest user equipment is authorized to use the client network, and a connection acceptance trigger that instructs the guest user equipment to send a reply message using the access credentials.

5. The network access point of claim 1, wherein the corroborating conditions further include authentication of a voice signature of a guest user associated with the guest user equipment detected by the host device and verification that the guest user equipment is not on a blacklist in a remote datastore.

6. The network access point of claim 1, wherein the operations further comprise providing the guest user equipment with access to the client network.

7. A method comprising:
detecting, by a network access point that is communicatively coupled to a host device, a unique identifier of a guest user equipment being broadcast from the guest user equipment, wherein the network access point is controlled, at least in part, by the host device, and wherein the host device is associated with a host user;
determining, based on the unique identifier of the guest user equipment, that the guest user equipment is not a recognized device;
in response to determining that the guest user equipment is not a recognized device, creating, by the network access point, an identity verification request message that seeks approval from the host device to allow the guest user equipment access to a client network provided by the network access point;
providing, by the network access point, the identity verification request message to the host device;
receiving, by the network access point, a trigger response message from the host device created by the host device in response to the host user granting the guest user equipment access to the client network via the network access point, wherein the trigger response message includes a network access request on behalf of the guest user equipment such that the guest user equipment does not initiate a network access request to gain access to the client network via the network access point;
determining, by the network access point, that the guest user equipment satisfies corroborating conditions, wherein the corroborating conditions include verification that the guest user equipment has visited a defined sequence of locations;
creating, by the network access point, based at least in part on receiving the trigger response message and on the guest user equipment satisfying the corroborating conditions, a network access package that provides the guest user equipment with access credentials to access the client network; and
providing the network access package to the guest user equipment.

8. The method of claim 7, further comprising determining that the guest user equipment exceeds a proximity time threshold for being in range of engaging in communication with the client network.

9. The method of claim 8, wherein creating the identity verification request message is further in response to determining that the guest user equipment exceeds the proximity time threshold.

10. The method of claim 7, wherein creating the network access package comprises:
creating a service set identifier for the client network;
creating a whitelist corresponding to the service set identifier;
instantiating the unique identifier of the guest user equipment within the whitelist;
generating access credentials for the guest user equipment; and
creating the network access package that includes the access credentials, a notification that the guest user equipment is authorized to use the client network, and a connection acceptance trigger that instructs the guest user equipment to send a reply message to the network access point using the access credentials.

11. The method of claim 7, wherein the corroborating conditions further include authentication of a voice signature of a guest user associated with the guest user equipment detected by the host device and verification that the guest user equipment is not on a blacklist in a remote datastore.

12. The method of claim 7, further comprising providing, by the network access point, the guest user equipment access to the client network.

13. A computer storage medium having computer-executable instructions stored thereon that, in response to execution by a processor of a network access point, cause the processor to perform operations comprising:
detecting a unique identifier of a guest user equipment being broadcast from the guest user equipment;
determining, based on the unique identifier of the guest user equipment, that the guest user equipment is not a recognized device;
in response to determining that the guest user equipment is not a recognized device, creating an identity verification request message that seeks approval from a host device to allow the guest user equipment access to a client network provided by the network access point, wherein the network access point is communicatively coupled to the host device and is controlled, at least in part, by the host device, and wherein the host device is associated with a host user;
providing the identity verification request message to the host device;
receiving a trigger response message from the host device created by the host device in response to the host user granting the guest user equipment access to the client network via the network access point, wherein the trigger response message created by the host device includes a network access request generated by the host device on behalf of the guest user equipment such that the guest user equipment does not initiate a network access request to gain access to the client network via the network access point;
determining that the quest user equipment satisfies corroborating conditions, wherein the corroborating conditions include verification that the guest user equipment has visited a defined sequence of locations;
creating, based at least in part on receiving the trigger response message and on the guest user equipment satisfying the corroborating conditions, a network access package that provides the guest user equipment with access credentials to access the client network; and
providing the network access package to the guest user equipment.

14. The computer storage medium of claim 13, wherein the operations further comprise determining that the guest user equipment exceeds a proximity time threshold for being in range of engaging in communication with the client network.

15. The computer storage medium of claim 14, wherein creating the identity verification request message is further in response to determining that the guest user equipment exceeds the proximity time threshold.

16. The computer storage medium of claim 13, wherein creating the network access package includes:
- creating a service set identifier for the client network;
- creating a whitelist corresponding to the service set identifier;
- instantiating the unique identifier of the guest user equipment within the whitelist;
- generating access credentials for the guest user equipment; and
- creating the network access package that includes the access credentials, a notification that the guest user equipment is authorized to use the client network, and a connection acceptance message that instructs the guest user equipment to send a reply message using the access credentials.

17. The computer storage medium of claim 13, wherein the corroborating conditions further include authentication of a voice signature of a guest user associated with the guest user equipment detected by the host device and verification that the guest user equipment is not on a blacklist in a remote datastore.

* * * * *